(12) United States Patent
Ishihara et al.

(10) Patent No.: US 9,158,112 B2
(45) Date of Patent: Oct. 13, 2015

(54) LIGHT SCANNING APPARATUS WITH SINGLE OPTICAL IMAGING ELEMENT AND IMAGE FORMING APPARATUS USING THE SAME

(71) Applicant: CANON KABUSHIKI KAISHA, Tokyo (JP)

(72) Inventors: Kazuyuki Ishihara, Utsunomiya (JP); Yuichi Tomioka, Utsunomiya (JP); Shuichi Kurokawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/447,302

(22) Filed: Jul. 30, 2014

(65) Prior Publication Data

US 2015/0035930 A1    Feb. 5, 2015

(30) Foreign Application Priority Data

Aug. 2, 2013  (JP) ................. 2013-161329

(51) Int. Cl.
| | |
|---|---|
| *B41J 15/14* | (2006.01) |
| *B41J 27/00* | (2006.01) |
| *G02B 26/12* | (2006.01) |
| *G03G 15/04* | (2006.01) |
| *B41J 2/47* | (2006.01) |
| *G06K 15/12* | (2006.01) |
| *H04N 1/113* | (2006.01) |

(52) U.S. Cl.
CPC ............ *G02B 26/125* (2013.01); *G02B 26/124* (2013.01); *G03G 15/04036* (2013.01); *B41J 2/471* (2013.01); *G06K 15/1219* (2013.01); *H04N 1/1135* (2013.01); *H04N 2201/0082* (2013.01)

(58) Field of Classification Search
USPC ................. 347/230, 231, 241–244, 256–261; 359/662, 664, 708, 711, 718
See application file for complete search history.

(56) References Cited

U.S. PATENT DOCUMENTS

2007/0127105 A1*  6/2007  Igarashi ................. 359/205
2007/0216983 A1*  9/2007  Hayashi et al. ......... 359/201
2011/0080624 A1    4/2011  Ku

FOREIGN PATENT DOCUMENTS

| JP | 08248308 A | * | 9/1996 | ............ G02B 13/00 |
|---|---|---|---|---|
| JP | 2004-279544 A | | 10/2004 | |
| JP | 2007333914 A | | 12/2007 | |
| JP | 3149596 U | | 3/2009 | |

\* cited by examiner

*Primary Examiner* — Hai C Pham
(74) *Attorney, Agent, or Firm* — Canon USA, Inc. IP Division

(57) ABSTRACT

A light scanning apparatus includes a light source, a deflector configured to deflect a light flux from the light source, and an imaging optical system configured to guide the light flux deflected at the deflector onto a scanned surface. The imaging optical system consists of a single imaging optical element, wherein, on the optical axis of the imaging optical system, the conditions $0.15 \leq T2/Sk \leq 0.3$ and $0.03 \leq d/K \leq 0.08$ are satisfied. A condition $0.3 \leq B \leq 0.6$ is satisfied at a condensing position Y where a scanning angle $\theta$ is greatest, when the condensing position Y in the main scanning direction on the scanned surface of the light flux deflected at the scanning angle $\theta$ by the deflector is expressed by $Y=(K/B) \times \tan(B \times \theta)$.

10 Claims, 26 Drawing Sheets

IMAGE HEIGHT [mm]

IMAGE HEIGHT [mm]

IMAGE HEIGHT [mm]

IMAGE HEIGHT [mm]

IMAGE HEIGHT [mm]

IMAGE HEIGHT [mm]

LIGHT SCANNING APPARATUS WITH SINGLE OPTICAL IMAGING ELEMENT AND IMAGE FORMING APPARATUS USING THE SAME

BACKGROUND OF THE INVENTION

1. Field of the Invention

The present invention relates to a light scanning apparatus, suitable for use in an image formation apparatus such as a laser beam printer (LBP), digital copying machine, multi-function printer and the like.

2. Description of the Related Art

There has been demand for a reduction in the size and cost of light scanning devices and image forming devices using the same. US2011/0080624 proposes configuring an imaging optical system using only one imaging lens (imaging optical element) in order to reduce the cost of an imaging optical system included in a light scanning apparatus. US2007/0127105 discloses arranging the scanning speed on a surface being scanned to be non-uniform in a light scanning apparatus having only one imaging lens, thereby enabling the thickness of the imaging lens to be reduced, while achieving good imaging performance by correcting field curvature.

However, the light scanning apparatuses in US2011/0080624 and US2007/0127105 require the imaging lens to be sufficiently distant from a deflector to achieve good imaging performance, so the width of the imaging lens is large. Accordingly, the size of the light scanning apparatuses cannot be significantly reduced, and the manufacturing cost per imaging lens is high.

SUMMARY OF THE INVENTION

It has been found desirable to provide a light scanning apparatus having an imaging optical system configured to include only one imaging optical element which enables size and cost reductions, while achieving good imaging performance from the imaging optical element.

A light scanning apparatus includes a light source, a deflector configured to deflect a light flux from the light source, and an imaging optical system configured to guide the light flux deflected at the deflector onto a scanned surface. The imaging optical system consists of a single imaging optical element, in which, on the optical axis of the imaging optical system, the following conditions are satisfied $$0.15 \leq T2/Sk \leq 0.3$$

$$0.03 \leq d/K \leq 0.08$$

where T2 represents the distance from a deflecting surface of the deflector to an exit surface of the imaging optical element, Sk represents the distance from the exit surface of the imaging optical element to the scanned surface, d represents the thickness of the imaging optical element, and K represents an imaging coefficient of the imaging optical element. Also, the condition $$0.3 \leq B \leq 0.6$$

is satisfied at a condensing position Y where a scanning angle $\theta$ is greatest, when the condensing position Y in the main scanning direction on the scanned surface of the light flux deflected at the scanning angle $\theta$ by the deflector is expressed by $$Y = (K/B) \times \tan(B \times \theta)$$

where B is a scanning properties coefficient.

Further features of the present invention will become apparent from the following description of exemplary embodiments with reference to the attached drawings.

DESCRIPTION OF THE EMBODIMENTS

Figure 1A:
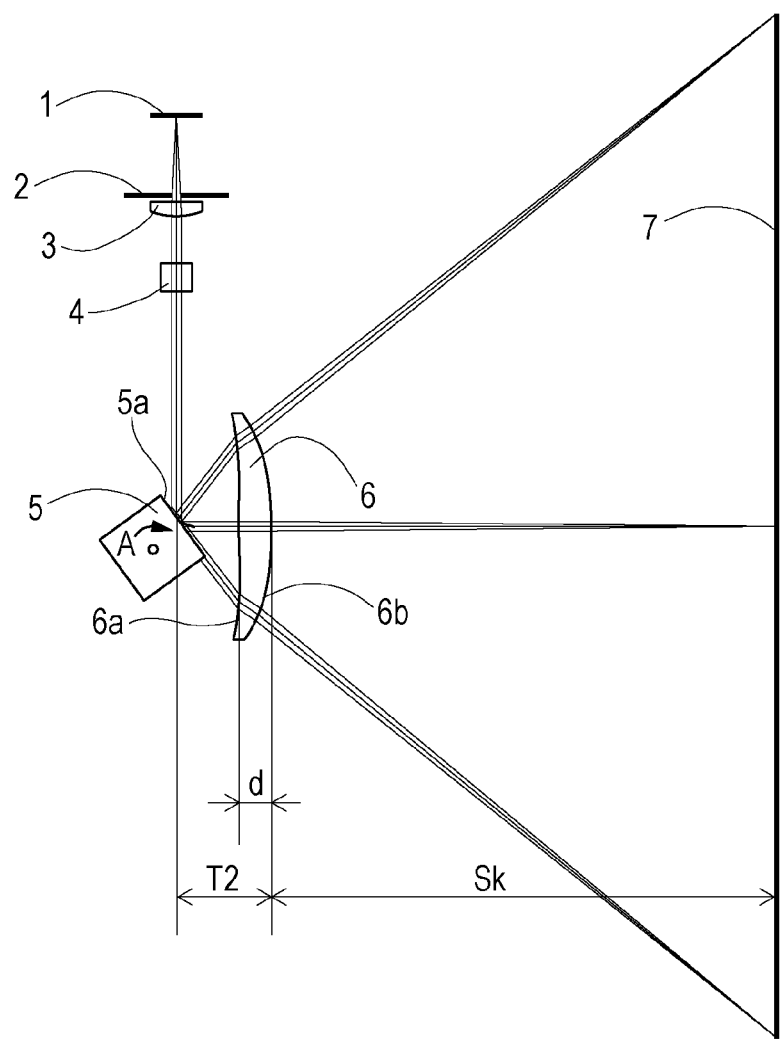
FIGS. 1A and 1B are cross-sectional views of principal portions of a light scanning apparatus according to a first embodiment.

Embodiments of the present invention will be described in detail with reference to the attached drawings. Members which are the same in the drawings are denoted with the same reference numerals, and redundant description will be omitted. Each of the embodiments of the present invention described below can be implemented solely or as a combination of a plurality of the embodiments or features thereof where necessary or where the combination of elements or features from individual embodiments in a single embodiment is beneficial.

Note that in the following direction, the term "main scanning direction" means a direction perpendicular to a rotational axis of a deflector and an optical axis of an imaging optical system (the direction in which a light flux is deflected by the deflector), and the term "sub-scanning direction" means a direction parallel to the rotational axis of the deflector. Also, the term "main scanning cross-section" means a cross-section including the main scanning direction and optical axis direction of the imaging optical system (a cross-section perpendicular to the sub-scanning direction), and the term "sub-scanning cross-section" means a cross-section perpendicular to the main scanning direction.

First Embodiment

Figure 1B:
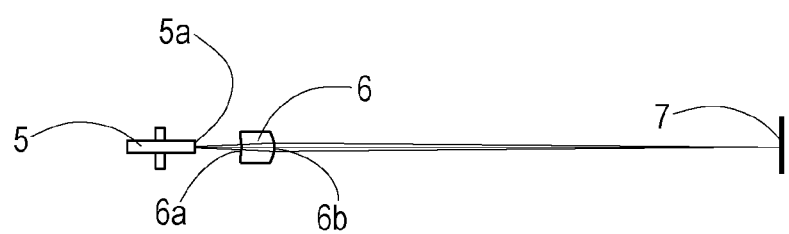

A light scanning apparatus according to a first embodiment of the present invention will be described in detail. FIGS. 1A and 1B are cross-sectional views of principal portions of a light scanning apparatus according to a first embodiment. FIG. 1B illustrates a main scanning cross-section, and FIG. 1A illustrates a sub-scanning cross-section.

In the present embodiment, a light flux which has been emitted from a light source 1 is shaped into an elliptical shape at an aperture diaphragm 2, and is input to a coupling lens 3. The light flux which has passed through the coupling lens 3 is converted into generally parallel light, and is input to an anamorphic lens 4. Note that generally parallel light includes light weakly convergent and light weakly divergent. The anamorphic lens 4 has positive refracting power in a main scanning section, and converts the input light flux into converging light at the main scanning section. A sub-scanning section of the anamorphic lens 4 condenses the light flux near a deflecting surface 5a of a deflector 5, forming a long line image in the main scanning direction.

The light flux which has passed through the anamorphic lens 4 is deflected by reflection at the deflecting surface 5a of the deflector 5, and is input to an imaging lens 6 serving as an imaging optical element. The imaging optical system according to the present embodiment is configured including a single imaging optical element (the imaging lens 6). The light flux which has passed through the imaging lens 6 is guided to a scanned surface (photosensitive surface) 7. At this time, both the main scanning section and sub-scanning section of the imaging lens 6 form a spot-shaped image near the scanned surface 7. The light scanning apparatus according to the present embodiment operates such that the deflector 5 is rotated at a constant speed in the direction of the arrow A by a driving unit omitted from illustration, so as to scan the light on the scanned surface 7 in the main scanning direction, thereby forming an electrostatic latent image on the scanned surface 7.

A semiconductor laser, for example, may be used as the light source 1, and may have one or multiple light emitters. While an elliptical diaphragm is used as the aperture diaphragm 2 according to the present embodiment, this is not restricted, and a rectangular diaphragm or the like may be used. Also, while the coupling lens 3 and anamorphic lens 4 making up the incident optical system are provided individually in the present embodiment, the incident optical system may be configured having a single optical element where the optical functions of the two are integrated. A rotating polygon mirror having four deflecting faces serves as the deflector 5 according to the present embodiment, but this is not restrictive, and the number of faces may be more than four.

The imaging lens 6 has two optical surfaces (lens surface), which are an entrance surface (first surface) 6a and an exit surface (second surface) 6b, configured to scan the scanned surface 7 by the light flux deflected by the deflecting surface 5a, at the main scanning section, according to certain intended scanning properties. The imaging lens 6 realizes optical face tangle error compensation (alleviating scanning positional shift in the sub-scanning direction on the scanned surface 7 in a case of face table error of the deflecting surface 5a), due to near the deflecting surface 5a and near the scanned surface 7 being in a conjugate relationship.

The imaging lens 6 according to the present embodiment is a plastic molded lens formed by injection molding, but a glass molded lens may be used for the imaging lens 6 instead. Forming a molded lens having an aspherical shape is easy and suited for mass-production, so the production and optical performance can be improved by using a molded lens for the imaging lens 6.

Table 1 shows the configuration of the light scanning apparatus according to the present embodiment.

TABLE 1

| Incident optical system configuration/imaging optical system layout | | | Imaging lens data | | |
|---|---|---|---|---|---|
| | | | | Surface 6a | Surface 6b |
| Light source wavelength | λ(nm) | 790 | | | |
| Thickness of laser cover glass | dcg(mm) | 0.25000 | Generatrix R | 1.37825E+02 | −9.76141E+01 |
| Refraction index of laser cover glass | n0 | 1.51052 | Ky | 0.00000E+00 | 0.00000E+00 |
| Distance from light emission point to aperture diaphragm | d0(mm) | 17.03000 | B2u | 0.00000E+00 | 0.00000E+00 |
| Distance from light emission point to first surface of coupling lens | d1(mm) | 18.33000 | B4u | −3.25357E−05 | −1.37466E−05 |
| Curvature radius of first surface of coupling lens | R1(mm) | ∞ | B6u | 7.96200E−08 | −3.18584E−09 |
| Curvature radius of second surface of coupling lens | R2(mm) | −15.21639 | B8u | −8.99197E−11 | 4.34223E−11 |
| Aspherical surface coefficient of second surface of coupling lens | C4 | 0.00000 | B10u | 2.00389E−14 | −3.77244E−14 |
| Thickness of coupling lens | d2(mm) | 3.00000 | B12u | 2.66311E−17 | −5.34786E−18 |
| Refraction index of coupling lens | n1 | 1.76167 | B2l | 0.00000E+00 | 0.00000E+00 |

TABLE 1-continued

| Incident optical system configuration/imaging optical system layout | | | Imaging lens data | |
|---|---|---|---|---|
| | | | Surface 6a | Surface 6b |
| Distance from second surface of coupling lens to first surface of anamorphic lens | d3(mm) | 13.52000 | B4l −4.80349E−05 | −2.25543E−05 |
| Sub-scanning curvature radius of first surface of anamorphic lens | Rs3(mm) | 26.99300 | B6l 1.37181E−07 | 1.30793E−08 |
| Main scanning curvature radius of first surface of anamorphic lens | Rm3(mm) | 908.49673 | B8l −2.04346E−10 | 3.94222E−12 |
| Sub-scanning curvature radius of second surface of anamorphic lens | Rs4(mm) | ∞ | B10l 1.02767E−13 | 3.89839E−14 |
| Main scanning curvature radius of second surface of anamorphic lens | Rm4(mm) | ∞ | B12l 1.06588E−17 | −1.03781E−16 |
| Thickness of anamorphic lens | d4(mm) | 6.00000 | Sagittal r −1.50770E+01 | −5.78350E+00 |
| Refraction index of anamorphic lens | n2 | 1.51052 | kz 0.00000E+00 | 0.00000E+00 |
| Distance from second surface of anamorphic lens to on-axis deflection surface (5a) | d5(mm) | 49.15000 | E2u −5.01550E−03 | 4.08621E−04 |
| Distance from on-axis deflection surface (5a) to first surface of imaging lens (6a) | d6(mm) | 12.00000 | E4u 4.69724E−05 | −6.20656E−06 |
| Thickness of imaging lens (6a to 6b) | d(mm) | 5.80000 | E6u −1.83818E−07 | 3.33578E−08 |
| Refraction index of imaging lens | n3 | 1.52397 | E8u 3.40073E−10 | −8.34965E−11 |
| Distance from second surface of imaging lens (6b) to scan surface (7) | Sk(mm) | 102.20000 | E10u −3.38532E−13 | 6.82989E−14 |
| Main scanning focal point distance of imaging lens | fm(mm) | 109.98882 | E12u 1.85260E−16 | 5.80874E−18 |
| Amount of Y-direction decentering of optical axis at imaging lens | ΔY(mm) | 0.00000 | E14u 0.00000E+00 | 0.00000E+00 |
| Main scanning incident angle of rotating polygonal mirror of incident optical system | α | 90.00000 | E2l −4.93988E−03 | 5.19482E−04 |
| Printing range of photosensitive drum surface | W(mm) | ±107 | E4l 6.47965E−05 | −6.32869E−06 |
| Maximum scanning angle | $\theta_{Max}$ | ±52.598 | E6l −3.92962E−07 | 3.83646E−08 |
| Imaging coefficient at on-axis image height | K | 105.00000 | E8l 1.02815E−09 | −1.64185E−10 |
| Scanning property coefficient | B | 0.58824 | E10l −1.05983E−12 | 3.10730E−13 |
| Number of faces of polygonal mirror | men | 4 | E12l 2.09726E−16 | −2.21980E−16 |
| Center position of polygonal mirror (optical axis direction) | PX(mm) | −5.57090 | E14l 0.00000E+00 | 0.00000E+00 |
| Center position of polygonal mirror (main scanning direction) | PY(mm) | −4.42910 | M0,2 0.00000E+00 | 0.00000E+00 |
| Radius of circumscribed circle of polygonal mirror | Rpol | 10.00000 | M1,2 −2.23544E−04 | −1.76172E−04 |
| Aperture diameter (main scanning × sub scanning) | ellipse(mm) | 1.72 × 4.2 | M0,3 0.00000E+00 | 0.00000E+00 |
| * Refraction index measured at wavelength of 790 nm | | | M1,3 0.00000E+00 | 0.00000E+00 |
| | | | M0,4 3.66753E−03 | 3.13747E−03 |
| | | | M1,4 0.00000E+00 | 0.00000E+00 |

The lens surface shape x of the imaging lens 6 according to the present embodiment is defined by the following expressions where the intersection point of the lens surface and the optical axis is the origin point, the axis in the direction of the optical axis in the X axis, the axis orthogonal to the optical axis in the main scanning section is the Y axis, and the axis orthogonal to the optical axis in the sub-scanning section is the Z axis.

$$x = X + S \quad (1)$$

$$X = \frac{\frac{Y^2}{R}}{1 + \sqrt{1 - (1+K_y)\left(\frac{Y}{R}\right)^2}} + \Sigma_{n=1}^{6} B_{2ni} Y^{2n} \quad (2)$$

$$S = \frac{Z^2/r'}{1 + \sqrt{1 - (1+k_z)\left(\frac{Z}{r'}\right)^2}} + \Sigma_{j=0}^{1} \Sigma_{h=2}^{4} M_{jh} Y^j Z^h \quad (3)$$

$$r' = r\left(1 + \Sigma_{n=1}^{7} E_{2ni} Y^{2n}\right) \quad (4)$$

Expression (2) represents the shape of the lens surface (generatrix shape) in the main scanning section (XY cross-section), and Expression (3) represents the shape of the lens surface (sagittal shape) in the sub-scanning section (ZX cross-section) at any image height Y. As shown in Expression (4), the curvature radius r' of the sagittal shape of the lens surface changes in accordance with the value of Y. In Expressions (2) and (4), the aspherical coefficients are set such that Y≥0 is "upper" and Y≤0 is lower, and the aspherical coefficients are shown in Table 1 such that "upper" is i=u and "lower" is i=l.

Next, a light scanning apparatus according to the related art, serving as a comparative example, will be described to facilitate understanding of the advantages of the present invention.

Figure 25A:
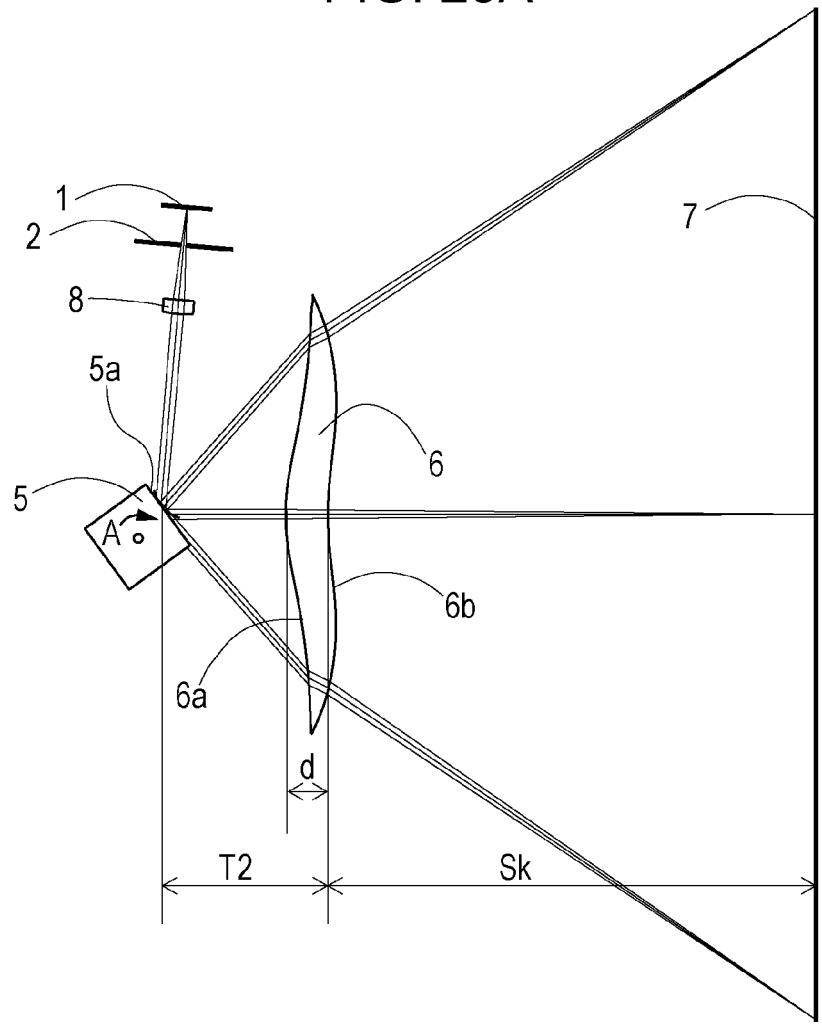
FIGS. 25A and 25B are cross-sectional views of principal portions of a light scanning apparatus according to a comparative example.
Figure 25B:
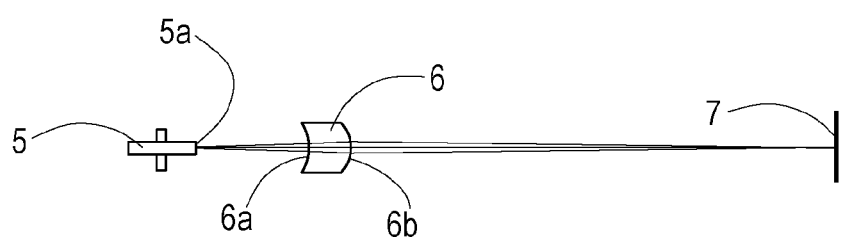

FIGS. 25A and 25B are cross-sectional views of principal portions of the light scanning apparatus according to the comparative example. FIG. 25A illustrates the main scanning section, and FIG. 25B illustrates the sub-scanning section. The comparative example differs from the present embodiment in that the placement and configuration of the imaging lens 6 is different, and that the coupling lens 3 and anamorphic lens 4 are integrated to form an anamorphic lens 8. Whether or not the coupling lens 3 and anamorphic lens 4 are integrated has no bearing on the present embodiment, so just the placement and configuration of the imaging lens 6 will be described here.

In the comparative example, the light flux deflected by the deflector 5 rotating at a constant speed (constant angular velocity) passes through the imaging lens 6 and scans the scanned surface 7 at a constant speed. The imaging lens 6 is sufficiently distanced from the deflecting surface 5a of the deflector 5 in the comparative example, to realize both constant speed (linearity) of the light flux on the scanned surface 7 and imaging performance. Further, the comparative example reduces the distance from the deflector 5 to the scanned surface 7 by converting the light flux from the light source 1 into intense convergent light in the main scanning section by the anamorphic lens 8.

However, the thickness of the imaging lens 6 and width in the main scanning direction are great in the comparative example, since there is the need to sufficiently distance the imaging lens 6 from the deflector 5. The necessity to sufficiently distance the imaging lens 6 from the deflecting surface 5a of the deflector 5, in order to realize both linearity of the light flux on the scanned surface 7 and imaging performance, will be described.

In order to secure linearity while forming a good image on the scanned surface 7 using only a single imaging lens 6, there is a need to make the shape of the lens surface at the main scanning section such that the on-axis image height (Y=0) and off-axis image height (Y≠0) greatly differ, as with the comparative example. If this imaging lens 6 is positioned in close proximity with the deflector 5, the change in surface shape in the main scanning section is more pronounced in the pupil of the light flux passing through the imaging lens 6. Accordingly, if the imaging lens 6 is positioned in close proximity with the deflector 5 in the comparative example while securing linearity, comatic aberration increases at the main scanning section, leading to poorer imaging performance.

Thus, there is the need to sufficiently distance the imaging lens 6 from the deflector 5 in order to realize both linearity and imaging performance in the comparative example, and consequently, sufficient reduction in size of the imaging lens 6 cannot be realized.

The placement and configuration of the imaging lens 6 according to the present embodiment will now be described in detail. The imaging lens 6 according to the present embodiment has scanning properties where the light flux passing there through does not have linearity on the scanned surface 7. Imparting the imaging lens 6 with such scanning properties realizes placing the imaging lens 6 in proximity of the deflector 5 and also reducing the size of the imaging lens 6 and the size of the light scanning apparatus. The scanning properties of the imaging lens 6 according to the present embodiment are as in the following Expression (5)

$$Y = \frac{K}{B} \tan(B\theta) \tag{5}$$

where θ represents the scanning angle (scanning field angle) by the deflector 5, Y (mm) represents the condensing position (image height) in the main scanning direction of the light flux on the scanned surface 7 deflected by the scanning angle θ, and K (mm) represents an imaging coefficient at the on-axis image height.

The on-axis image height means the image height on the optical axis (Y=0), and corresponds to scanning angle θ=0. The off-axis image height means the image height off of the optical axis (Y≠0), and corresponds to scanning angle θ≠0. Further, the term "maximum off-axis image height" means the image height when the scanning angle θ is greatest (maximum scanning field angle).

The imaging coefficient K is a coefficient serving as the f in scanning properties (fθ properties) Y=fθ when there is input of a light flux of parallel light to the imaging lens 6. That is to say, the imaging coefficient K is a coefficient used when there is input of a light flux to the imaging lens 6 other than parallel light, to bring the condensing position Y and the scanning angle θ into the proportionate relation the same as with the fθ properties. The imaging coefficient K for on-axis image height in the present embodiment is K=105, as shown in Table 1.

Note that B in Expression (5) is a coefficient to decide scanning properties of the imaging lens 6 according to the present embodiment (herein referred to as "scanning properties coefficient"), and B=0.588 in the present embodiment as shown in Table 1. Now when B=0, Expression (5) is Y=Kθ, so this is equivalent to the scanning properties Y=fθ with an imaging lens used in a light scanning apparatus according to the related art. Also, when B=1, Expression (5) is Y=K tan θ, which is equivalent to projection properties Y=f tan θ of a lens used in an imaging apparatus (camera) or the like. That is to say, by setting the scanning properties coefficient B in Expression (5) to the range of 0≤B≤1, the scanning properties between projection properties Y=f tan θ and fθ properties Y=fθ can be obtained.

Now, differentiating the Expression (5) with the scanning angle θ yields the scanning speed of the light flux on the scanned surface 7 with regard to the scanning angle θ, as in the following Expression (6).

$$\frac{dY}{d\theta} = \frac{K}{\cos^2(B\theta)} \tag{6}$$

Further, dividing Expression (6) by the speed dY/dθ=K at the on-axis image height yields the following Expression (7).

$$\frac{\frac{dY}{d\theta}}{K} - 1 = \frac{1}{\cos^2(B\theta)} - 1 = \tan^2(B\theta) \tag{7}$$

Expression (7) represents the amount of shift in linearity at each off-axis image height as to the on-axis image height, which is the shift amount of martial magnification at off-axis image height as to partial magnification at on-axis image height (partial magnification shift). The light scanning apparatus according to the present embodiment has partial magnification, so the scanning speed of the light flux is not the same at on-axis image height and off-axis image height, except for where B=0. That is to say, the scanning position at off-axis image height (scanning distance per unit time) is drawn out in accordance with the partial magnification, leading to deterioration of the image which the image forming apparatus forms (deterioration of printing performance) if this partial magnification shift is not taken into consideration.

Accordingly, the present embodiment obtains good printing performance in the same way as in a case where linearity is secured, but controlling the modulating timing (light-emitting timing) of the light source 1 in accordance with the partial magnification shift when B≠0 by a control unit omitted from illustration, so as to electrically correct the scanning position.

Also, assuming the partial magnification at the right side of Expression (7) to be dBY and the maximum scanning angle to be $\theta_{Max}$, the imaging lens 6 is preferably configured so as to satisfy the following Expression (8).

$$0.07 \leq dBY = \tan^2(B\theta_{Max}) \leq 0.5 \tag{8}$$

Any smaller than the lower limit of Expression (8) results in the partial magnification being too small, so good imaging performance cannot be ensured when the imaging lens 6 is brought into close proximity to the deflecting surface 5a. Any greater than the upper limit of Expression (8) results in the partial magnification being too great, so electrical correction of the scanning position becomes difficult. The maximum field angle $\theta_{Max}=52.6°$ in the present embodiment as shown in Table 1, so the partial magnification shift is dBY=0.36, which satisfies Expression (8). Note that when dBY=0.36, the scanning speed at the maximum off-axis image height is 36% faster than the scanning speed at on-axis image height.

Also, the type of light flux (convergent light flux, divergent light flux, or parallel light) being input to the imaging lens 6, i.e., appropriately selecting the convergence value of the light flux input to the imaging lens 6, is an important factor in improving the imaging performance of the light flux on the scanned surface 7. The following is a detailed description of the convergence value Sk/fm on the optical axis of the imaging lens 6, where fm represents the focal length in the main scanning direction, and Sk represents the distance from the exit surface 6b of the imaging lens 6 to the scanned surface 7.

Figure 7:
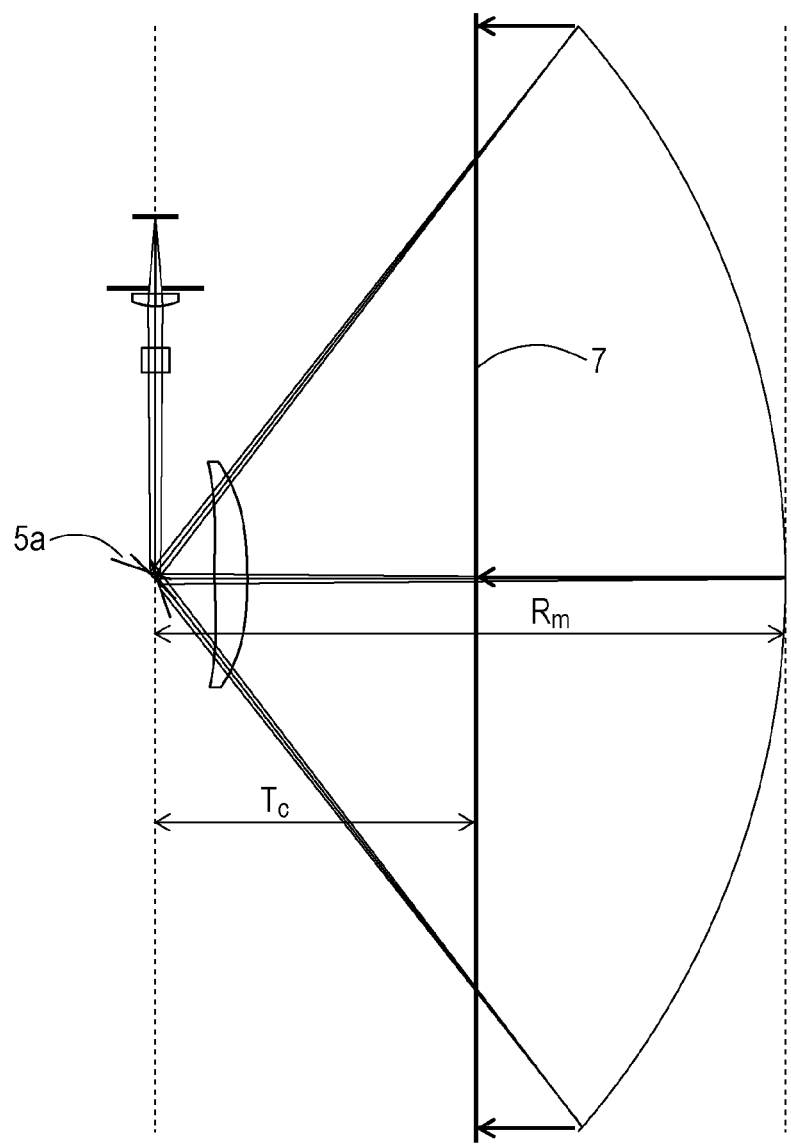
FIG. 7 is a diagram for describing the relation between convergence value and imaging performance in the first embodiment.

FIG. 7 is a diagram for describing how the convergence value contributes to imaging performance. The light scanning apparatus illustrated in FIG. 7 has an imaginary lens where the refractive index of the imaging lens is 1, so only the coupling lens and anamorphic lens have refractive power. The light emitted from the light source of the light scanning apparatus in FIG. 7 is converted into generally parallel light at the coupling lens, and further is converted into intensely converted light at the main scanning section by the anamorphic lens, and condensed near the deflecting surface 5a at the sub-scanning section. Rm represents the distance from the deflecting surface 5a to the condensing position of the light flux at the main scanning section, and Tc represents the distance from the deflecting surface 5a to the scanned surface 7 on the optical axis.

Now, the light flux deflected at the deflecting surface 5a is convergent light at the main scanning section, and accordingly is condensed at the position Rm behind the scanned surface 7 in a case where no imaging lens is disposed. Deflection of the light flux at the deflecting surface 5a changes the condensation position of the light flux into an arc-shaped form having a radius Rm centered on the deflecting surface 5a. In other words, not having an imaging lens causes negative image plane curvature. Accordingly, an imaging lens has to be configured to generate positive image plane curvature in order to correct the image curvature at all image heights on the scanned surface 7 at the main scanning section, from the on-axis image height to all off-axis image heights.

One method to generate image plane curvature at the imaging lens is to perform bending at the entrance surface and exit surface of the imaging lens. However, if the convergence value or degree of divergence of the light flux input to the imaging lens is too great, the correction amount due to bending is great, so the image plane curvature cannot be sufficiently corrected. Also, increased bending amount tends to result in poorer imaging performance due to relational shift in position between the entrance surface and exit surface, so this is undesirable from a manufacturing perspective as well.

Accordingly, the above-described convergence value Sk/fm is preferably set so as to satisfy the following Expression (9). Thus, the image plane curvature can be corrected on the scanned surface 7, and consequently imaging performance can be improved.

$$0.8 \leq \frac{Sk}{fm} \leq 1.2 \qquad (9)$$

In a case where the convergence Sk/fm falls below the lower limit in Expression (9), there is a need to generate powerful positive image plane curvature by the imaging lens, so the refractive power as to the off-axis image heights has to be made weaker than the refractive power as to the on-axis image height. As a result, the partial magnification shift shown in Expression 7 increases, and the amount of electrical correction of the scanning position increases. In a case where the convergence Sk/fm exceeds the upper limit in Expression (9), there is a need to make the refractive power at the main scanning section of the imaging lens 6 great to generate negative image plane curvature by the imaging lens, making reduction in the thickness of the imaging lens 6 more difficult.

More preferably, the convergence value Sk/fm is set so as to satisfy the following Expression (10).

$$0.9 \leq \frac{Sk}{fm} \leq 1.1 \qquad (10)$$

By setting the convergence value Sk/fm so as to satisfy Expression (10), the bending amount at the lens surfaces of the imaging lens can be reduced, and consequently better imaging performance can be obtained. In the present embodiment, Sk=102.2 and fm=109.98 as shown in Table 1, so the convergence is Sk/fm=0.93, thereby satisfying Expression (9) and further Expression (10), and obtaining good imaging performance.

Next, specific imaging performance and printing performance in the light scanning apparatus according to the present embodiment will be described.

Figure 2:
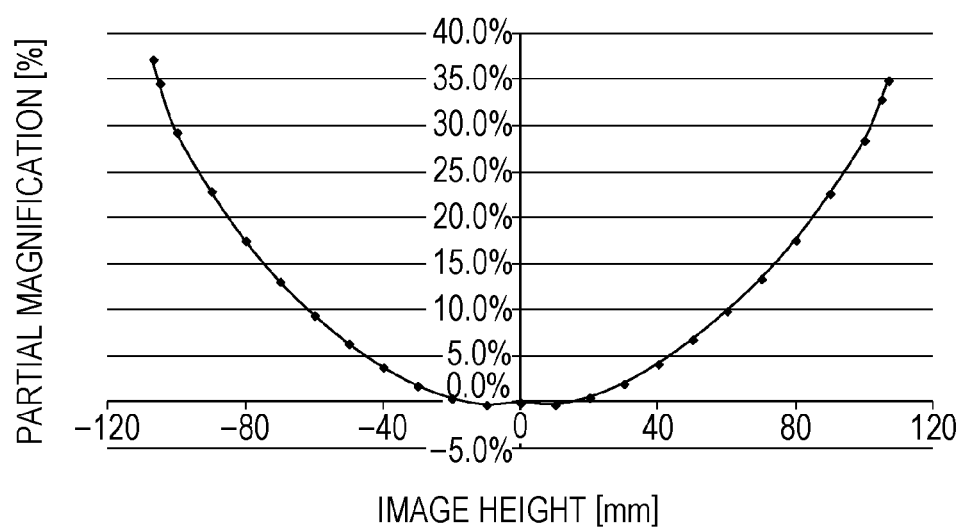
FIG. 2 is a diagram illustrating partial magnification shift as to Y=K$\theta$ in the first embodiment.

FIG. 2 illustrates partial magnification shift at each image height when fitting the scanning position on the scanned surface 7 according to properties of Y=Kθ in the preset embodiment. The scanning properties according to Expression (5) are imparted to the imaging lens 6 in the present embodiment, so the partial magnification gradually increases away from the on-axis image height toward off-axis image height, as illustrated in FIG. 2. Accordingly, there is no longer the need to rapidly change the lens surface shape at the main scanning section to secure linearity at off-axis image height, so the imaging lens 6 can have the intended scanning properties, and good imaging performance can be obtained.

Figure 3:
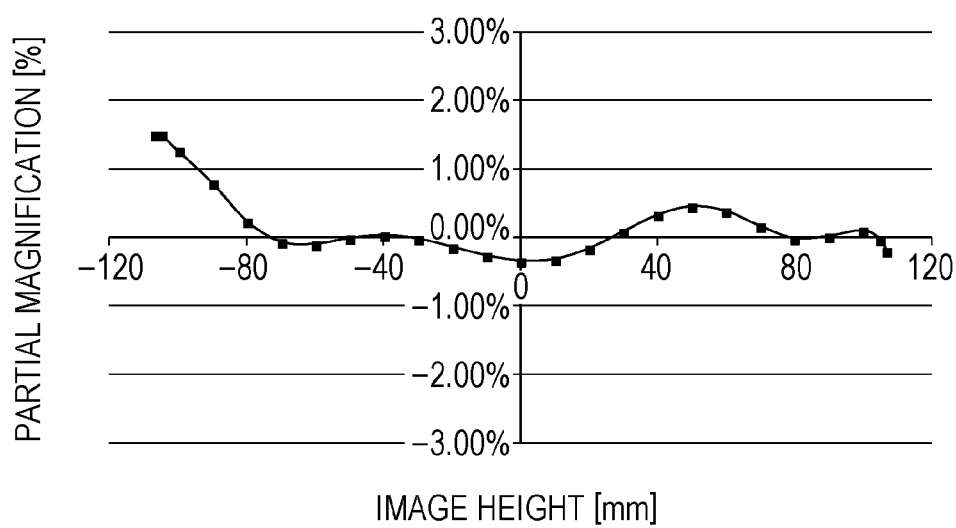
FIG. 3 is a diagram illustrating partial magnification shift after electric correction in the first embodiment.

FIG. 3 illustrates the partial magnification shift after electric correction, as to the partial magnification at the on-axis image height before electric correction of the scanning position on the scanned surface 7 based on the scanning properties in Expression (5) (FIG. 2). Generally speaking, good printing performance can be ensured if the partial magnification shift can be kept within 2% of the overall image height in an imaging optical system having fθ properties. The partial magnification shift after electric correction is around 1% at all image heights in the present embodiment, as can be seen from FIG. 3, so good printing performance is ensured.

Figure 4:
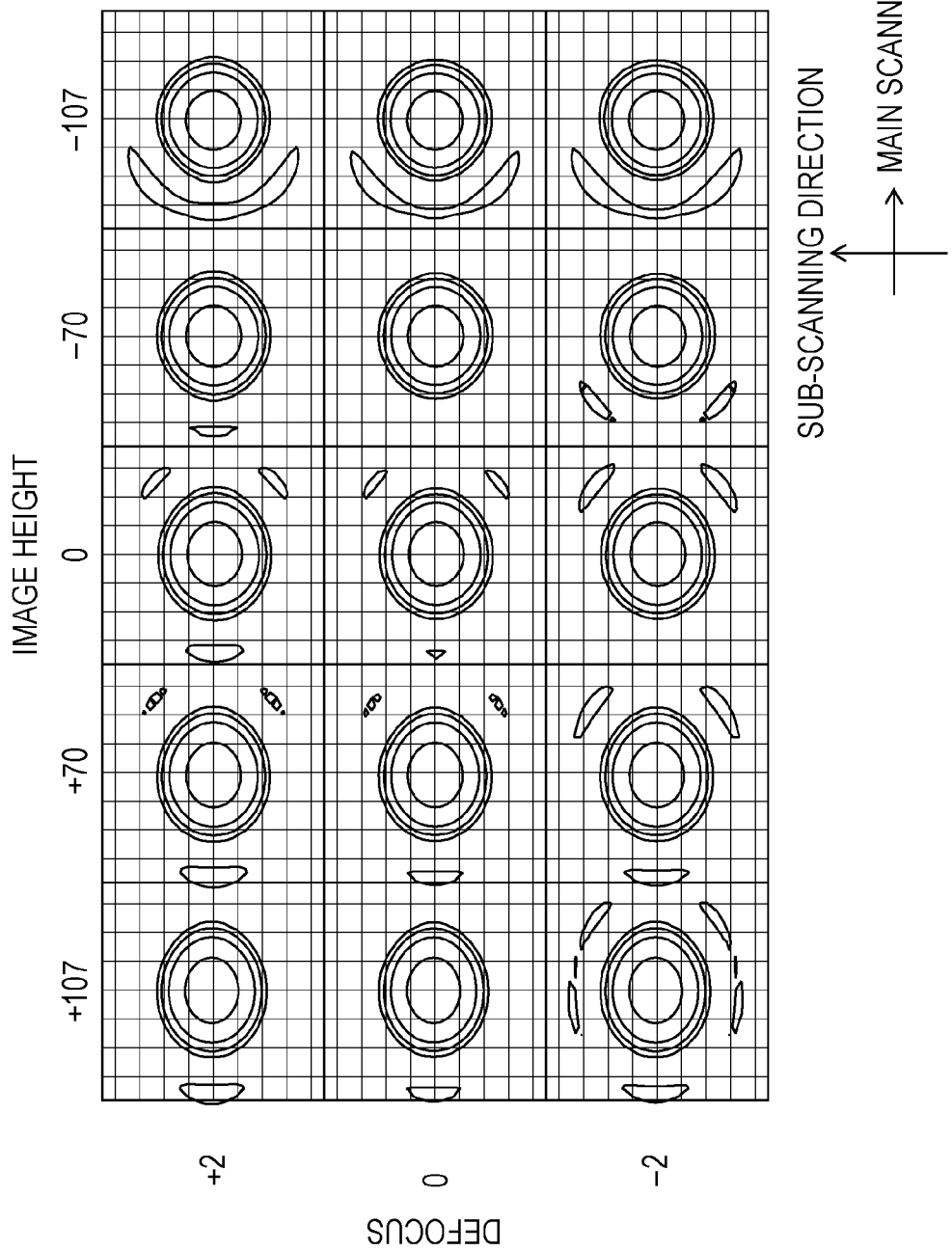
FIG. 4 is a diagram illustrating spot profiles at each image height in the first embodiment.

FIG. 4 illustrates spot profiles at each image height on the scanned surface 7 according to the present embodiment. FIG. 4 illustrates spot profiles for defocus of X=±2 mm and 0 mm in the optical axis direction of the imaging lens 6 from the scanned surface 7, at each of Y=±107 mm, ±70 mm, and 0 mm. The level contour lines of each spot profile are set at the positions of 50%, 13.5%, 5%, and 2% as to the peak light quantity of the spot. Generally, side lobes of 1.35% or greater are problematic, but good spot profiles with few side lobes at each image height can be obtained in the present embodiment, as can be seen from FIG. 4.

Figure 5:
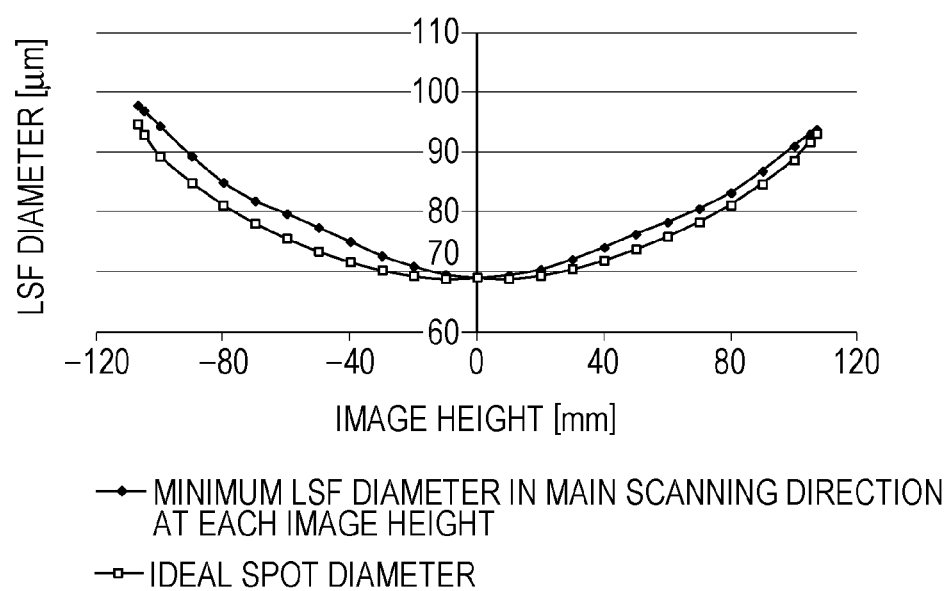
FIG. 5 is a diagram illustrating line spread function (LSF) diameter in the main scanning direction at each image height in the first embodiment.

FIG. 5 illustrates an ideal line spread function (LSF) in the main scanning direction at each image height, calculated from Expression (7), and the LSF according to the present embodiment. The LSF diameter in the main scanning direction here is the width where a light quantity profile, obtained by accumulating spot profiles in the sub-scanning direction at each image height, is sliced at a position of 13.5% as to the maximum value thereof. It can be seen from FIG. 5 that good, almost aplanatic spot profiles are obtained at all image heights in the present embodiment.

Figure 6A:
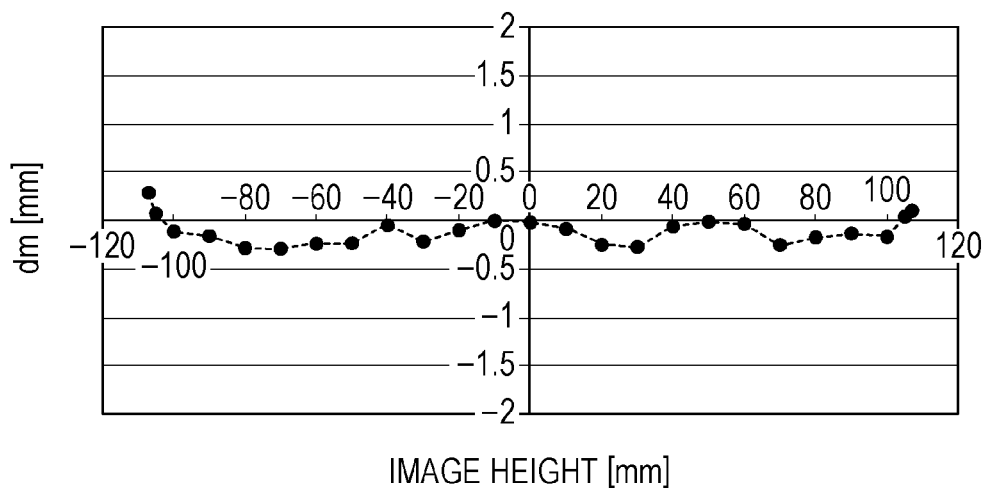
FIGS. 6A and 6B are diagrams illustrating image curvature on a scanned surface in the first embodiment.
Figure 6B:
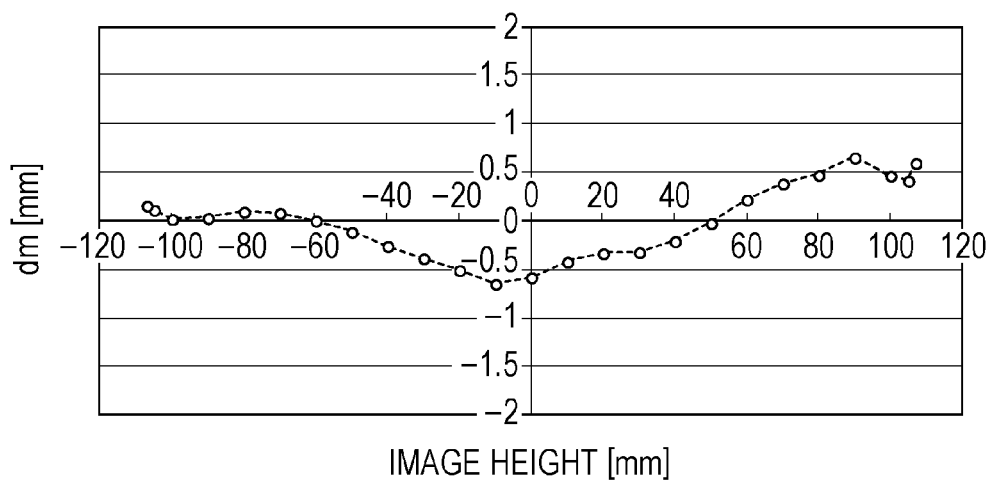

FIGS. 6A and 6B are diagrams illustrating image curvature on the scanned surface 7 in the first embodiment, where FIG. 6A illustrates main scanning image face curvature, and FIG. 6B illustrates sub-scanning image face curvature on the scanned surface 7. It can be seen from FIGS. 6A and 6B that both main scanning image face curvature and sub-scanning image face curvature are suitably corrected in the present embodiment.

Thus, it can be seen that the light scanning apparatus according to the present embodiment achieves good imaging performance and printing performance by having the scanning properties in Expression (5).

In expression (5), the scanning property coefficient B is preferably set to as to satisfy the following Expression (11).

$$0.3 \leq B \leq 0.6 \tag{11}$$

Any smaller than the lower limit of Expression (11) results in the partial magnification being too small, so good imaging performance cannot be ensured when the imaging lens 6 is brought into close proximity to the deflecting surface 5a. Any greater than the upper limit of Expression (11) results in the partial magnification being too great, so electrical correction of the scanning position becomes difficult. More preferably, the scanning property coefficient B is set to as to satisfy the following Expression (12).

$$0.45 \leq B \leq 0.6 \tag{12}$$

Setting the scanning coefficient B so as to satisfy Expression (12) enables even better imaging properties. The present embodiments is set such that B=0.588 as described above, so electric correction of the scanning position is easy, and good imaging properties are secured. While the present embodiment has a configuration where Expression (11), and preferably Expression (12), is satisfied at all image heights, the advantages of the present invention can be had if Expression (11), and preferably Expression (12), is satisfied at the condensation position Y (maximum off-axis image height) when the scanning angle θ is greatest.

The present embodiment is further preferably configured such that the following Expression (13) is satisfied $$0.15 \leq \frac{T2}{Sk} \leq 0.3 \tag{13}$$

where T2 represents the distance from the deflecting surface 5a to the exit surface 6b of the imaging lens 6, and Sk represents the distance from the exit surface 6b of the imaging lens 6 to the scanned surface 7.

Any smaller than the lower limit of Expression (13) results in the imaging lens 6 being too close to the deflecting surface 5a, and ensuring imaging performance and printing performance becomes difficult. Any greater than the upper limit of Expression (13) results in the imaging lens 6 being too far from the deflecting surface 5a, and the size of the light scanning apparatus becomes large.

The present embodiment is further preferably configured such that the following Expression (14) is satisfied.

$$0.15 \leq \frac{T2}{Sk} \leq 0.27 \tag{14}$$

A configuration where Expression (14) is satisfies enables reduction in size of the light scanning apparatus to be achieved, while ensuring better imaging performance and printing performance. It can be seen from Table 1 that T2=d6+d=17.8 in the present embodiment, so T2/Sk=0.17, which satisfies Expression (13) and further Expression (14), thereby achieving reduction in size of the light scanning apparatus while simultaneously realizing good imaging performance and printing performance.

The present embodiment is further preferably configured such that the thickness d of the imaging lens 6 on the optical axis, and the above-described imaging coefficient K, satisfy the following Expression (15).

$$0.03 \leq \frac{d}{K} \leq 0.08 \tag{15}$$

Expression (15) is an expression to correlate the imaging coefficient K with the thickness d of the imaging lens 6. The imaging coefficient K needs to be appropriately set in accordance with the size of the scanning width (printing region) on the scanned surface 7 (e.g., A3, A4, etc.). The greater the scanning width is, the greater the imaging coefficient K is. Generally, in a light scanning apparatus having only a single imaging lens, the imaging coefficient for scanning an A4-size printing region is 90 to 140, and the imaging coefficient for scanning an A3-size printing region is 180 to 220.

That is to say, Expression (15) sets for suitable thickness conditions in accordance with the size of the scanning width. Any smaller than the lower limit of Expression (15), the edge thickness of the imaging lens 6 becomes too small and manufacturing the imaging lens 6 becomes difficult. Any greater than the upper limit of Expression (15), the thickness of the imaging lens 6 becomes too great, and manufacturing of the imaging lens 6 becomes costly.

The present embodiment is further preferably configured such that the following Expression (16) is satisfied.

$$0.04 \leq \frac{d}{K} \leq 0.07 \tag{16}$$

The light scanning apparatus according to the present embodiment handles an A4-size printing region and d/K=0.06 which satisfies Expression (15) and further Expression (16). Accordingly, the thickness of the imaging lens 6 is set suitably in accordance with the printing size.

Thus, according to the light scanning apparatus of the present embodiment, low cost and reduction in size can be realized while ensuring good imaging performance and printing performance.

Second Embodiment

A light scanning apparatus according to a second embodiment of the present invention will be described. The configuration of the light scanning apparatus according to the present embodiment is generally the same as the configuration of the light scanning apparatus according to the first embodiment, but differs from the first embodiment with regard to the point that negative refractive force is imparted to the anamorphic lens 4, so as to input divergent light into the imaging lens 6. The imaging lens 6 is configured so as to correct generation of negative image plane curvature, in order to correct positive image plane curvature on the scanned surface 7. Table 2 illustrates the configuration of the light scanning apparatus according to the present embodiment.

TABLE 2

| Incident optical system configuration/imaging optical system layout | | | | Imaging lens data | |
|---|---|---|---|---|---|
| | | | | Surface 6a | Surface 6b |
| Light source wavelength | λ(nm) | 790 | Generatrix R | 1.12482E+02 | −9.13138E+01 |
| Thickness of laser cover glass | dcg(mm) | 0.25000 | Ky | 0.00000E+00 | 0.00000E+00 |
| Refraction index of laser cover glass | n0 | 1.51052 | B2u | 0.00000E+00 | 0.00000E+00 |
| Distance from light emission point to aperture diaphragm | d0(mm) | 17.03000 | B4u | −3.35496E−05 | −1.28268E−05 |
| Distance from light emission point to first surface of coupling lens | d1(mm) | 18.33000 | B6u | 7.60776E−08 | −7.73488E−09 |
| Curvature radius of first surface of coupling lens | R1(mm) | ∞ | B8u | −7.34257E−11 | 4.05097E−11 |
| Curvature radius of second surface of coupling lens | R2(mm) | −15.21639 | B10u | −3.65549E−15 | −2.54276E−14 |
| Aspherical surface coefficient of second surface of coupling lens | C4 | 0.00000 | B12u | 3.95283E−17 | −8.22427E−18 |
| Thickness of coupling lens | d2(mm) | 3.00000 | B2l | 0.00000E+00 | 0.00000E+00 |
| Refraction index of coupling lens | n1 | 1.76167 | B4l | −4.61405E−05 | −2.04719E−05 |
| Distance from second surface of coupling lens to first surface of anamorphic lens | d3(mm) | 13.52000 | B6l | 1.39378E−07 | 1.48274E−08 |
| Sub-scanning curvature radius of first surface of anamorphic lens | Rs3(mm) | 26.99300 | B8l | −2.21765E−10 | −6.94865E−12 |
| Main scanning curvature radius of first surface of anamorphic lens | Rm3(mm) | −500.00000 | B10l | 1.07745E−13 | 5.34285E−14 |
| Sub-scanning curvature radius of second surface of anamorphic lens | Rs4(mm) | ∞ | B12l | 4.21628E−17 | −1.11447E−16 |
| Main scanning curvature radius of second surface of anamorphic lens | Rm4(mm) | ∞ | Sagittal r | −2.57382E+01 | −6.75366E+00 |
| Thickness of anamorphic lens | d4(mm) | 6.00000 | kz | 0.00000E+00 | 0.00000E+00 |
| Refraction index of anamorphic lens | n2 | 1.51052 | E2u | −5.60162E−03 | 5.98926E−04 |
| Distance from second surface of anamorphic lens to on-axis deflection surface (5a) | d5(mm) | 49.15000 | E4u | 4.45262E−05 | −6.86435E−06 |
| Distance from on-axis deflection surface (5a) to first surface of imaging lens (6a) | d6(mm) | 12.50000 | E6u | −1.92213E−07 | 2.85804E−08 |
| Thickness of imaging lens (6a to 6b) | d(mm) | 7.00000 | E8u | 4.15189E−10 | −7.22674E−11 |
| Refraction index of imaging lens | n3 | 1.52397 | E10u | −4.33308E−13 | 8.80508E−14 |
| Distance from second surface of imaging lens (6b) to scan surface (7) | Sk(mm) | 105.50000 | E12u | 1.66213E−16 | −4.32626E−17 |
| Main scanning focal point distance of imaging lens | fm(mm) | 97.33645 | E14u | 0.00000E+00 | 0.00000E+00 |
| Amount of Y-direction decentering of optical axis at imaging lens | ΔY(mm) | 0.08000 | E2l | −3.48421E−03 | 7.24819E−04 |
| Main scanning incident angle of rotating polygonal mirror of incident optical system | α | 90.00000 | E4l | 6.96891E−05 | −490969E−06 |
| Printing range of photosensitive drum surface | W(mm) | ±107 | E6l | −3.80845E−07 | 3.20408E−08 |
| Maximum scanning angle | $\theta_{Max}$ | ±53.516027 | E8l | 9.18186E−10 | −1.51934E−10 |
| Imaging coefficient at on-axis image height | K | 106.00000 | E10l | −1.51129E−12 | 3.54085E−13 |
| Scanning property coefficient | B | 0.50000 | E12l | 1.49392E−15 | −3.56975E−16 |
| Number of faces of polygonal mirror | men | 4 | E14l | 0.00000E+00 | 0.00000E+00 |
| Center position of polygonal mirror (optical axis direction) | PX(mm) | −5.57090 | M0,2 | 0.00000E+00 | 0.00000E+00 |
| Center position of polygonal mirror (main scanning direction) | PY(mm) | −4.42910 | M1,2 | 1.51614E−04 | −1.54086E−05 |
| Radius of circumscribed circle of polygonal mirror | Rpol | 10.00000 | M0,3 | 0.00000E+00 | 0.00000E+00 |
| Aperture diameter (main scanning × sub scanning) | ellipse(mm) | 1.72 × 4.2 | M1,3 | 0.00000E+00 | 0.00000E+00 |
| * Refraction index measured at wavelength of 790 nm | | | M0,4 | 2.20006E−03 | 2.39182E−03 |
| | | | M1,4 | 0.00000E+00 | 0.00000E+00 |

FIGS. 8 through 11B illustrate specific imaging performance and printing performance in the light scanning apparatus according to the present embodiment, in the same way as with the first embodiment.

Figure 8:
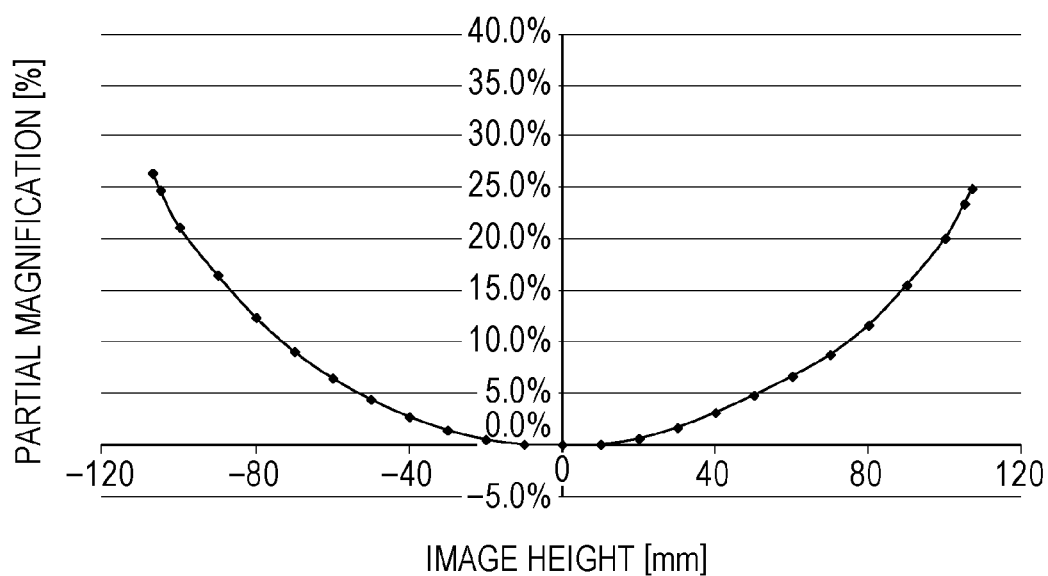
FIG. 8 is a diagram illustrating partial magnification shift as to Y=K$\theta$ in the second embodiment.

The present embodiment has a configuration where the refractive power at the main scanning section as to the off-axis image height is greater than the refractive power at the main scanning section as to the on-axis image height, and where the partial magnification shift is smaller than in the first embodiment. The partial magnification shift at the maximum off-axis height according to the present embodiment is dBY=0.264, as illustrated in FIG. 8. Also, the scanning property coefficient of the present embodiment is B=0.5 as shown in Table 2, thereby satisfying Expression (11) and further Expression (12), and yields scanning properties closer to the fθ properties as compared to the first embodiment. Accordingly, the present embodiment needs less amount of electrical correction of scanning position as compared to the first embodiment, and electrical correction is easier.

Figure 9:
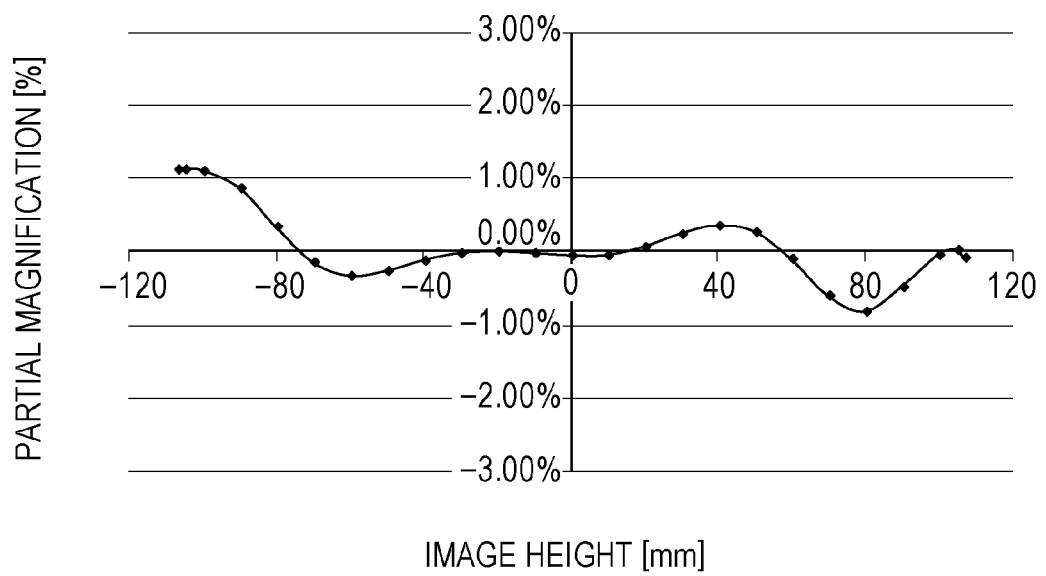
FIG. 9 is a diagram illustrating partial magnification shift after electric correction in the second embodiment.
Figure 10:
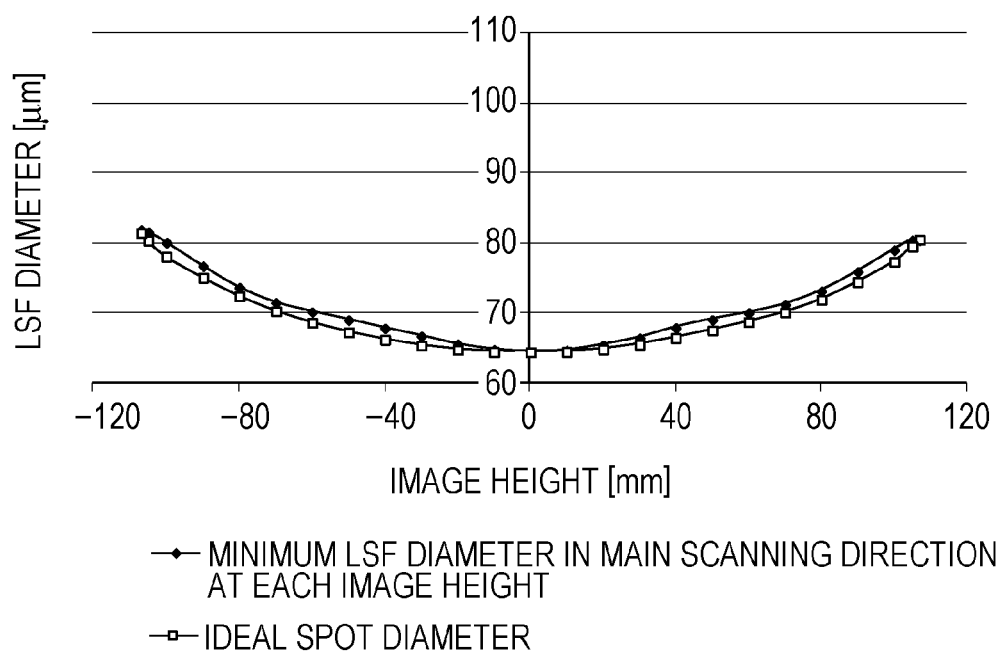
FIG. 10 is a diagram illustrating LSF diameter in the main scanning direction at each image height in the second embodiment.
Figure 11A:
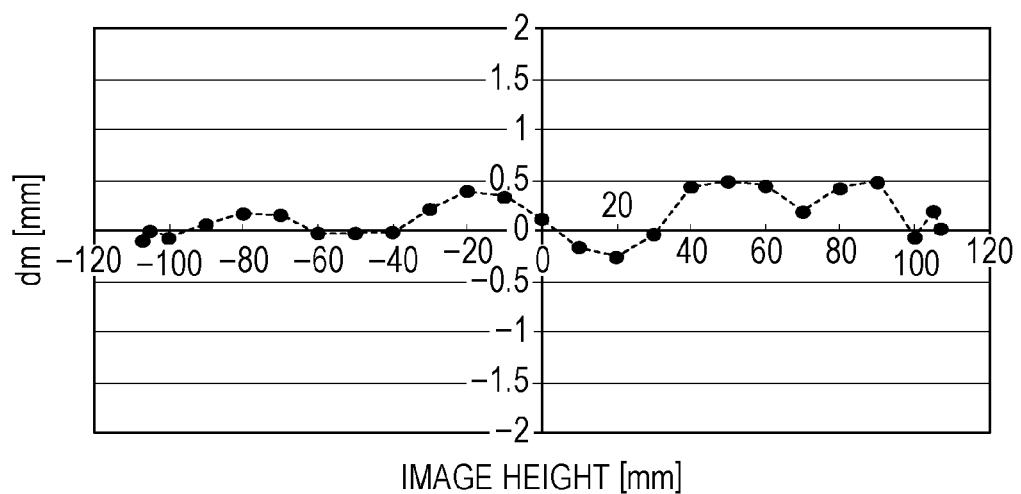
FIGS. 11A and 11B are diagrams illustrating image curvature on a scanned surface in the second embodiment.
Figure 11B:
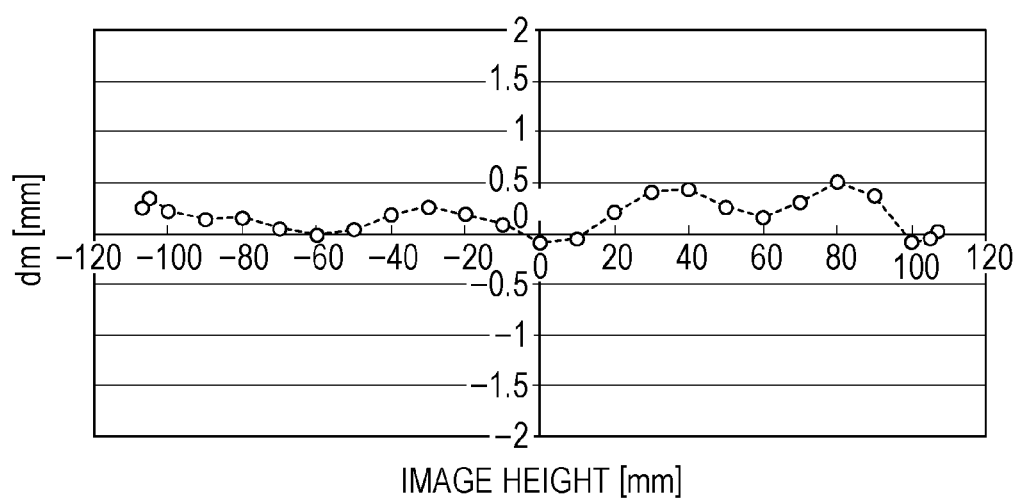

As illustrated in FIG. 9, the partial magnification shift after electric correction in the present embodiment is no more than 1.1% at the most, so it can be seen that good printing performance is secured. Also, the ideal LSF diameter and the LSF diameter according to the present embodiment generally match at each image height as illustrated in FIG. 10, so it can be seen that good imaging performance is secured at each image height. Further, it can be seen from FIGS. 11A and 11B that both the main scanning image plane curvature and sub-scanning image plane curvature on the scanned surface 7 are suitably corrected in the present embodiment as well.

Note that Sk=105.5, and fm=97.34 as shown in Table 2, so the convergence value Sk/fm=1.08. Accordingly, the imaging lens 6 can be made thinner while satisfying Expression (9) and further Expression (10). It can also be seen from Table 2 that T2=d6+d=19.5, so T2/sk=0.18, so as to satisfy Expression (13) and further Expression (14), thereby achieving reduction in size of the light scanning apparatus while simultaneously realizing good imaging performance and printing performance. Moreover, d=7 and K=106 as shown in Table 2, so d/K=0.066. Accordingly, the present embodiment satisfies Expression (15) and further Expression (16), so it can be seen that the thickness of the imaging lens 6 has been suitably selected in accordance with the printing size.

Thus, according to the light scanning apparatus of the present embodiment, low cost and reduction in size can be realized while ensuring good imaging performance and printing performance.

Third Embodiment

Figure 12A:
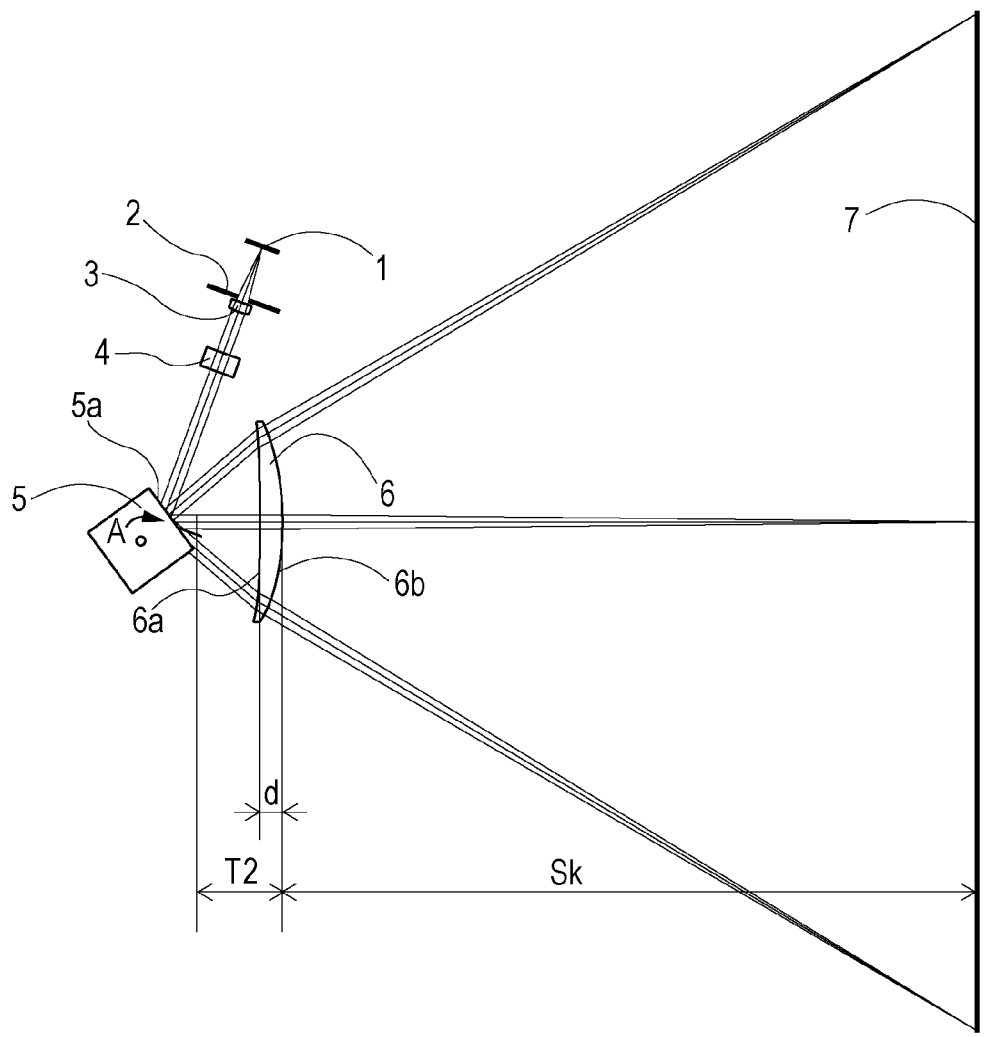
FIGS. 12A and 12B are cross-sectional views of principal portions of a light scanning apparatus according to a third embodiment.
Figure 12B:
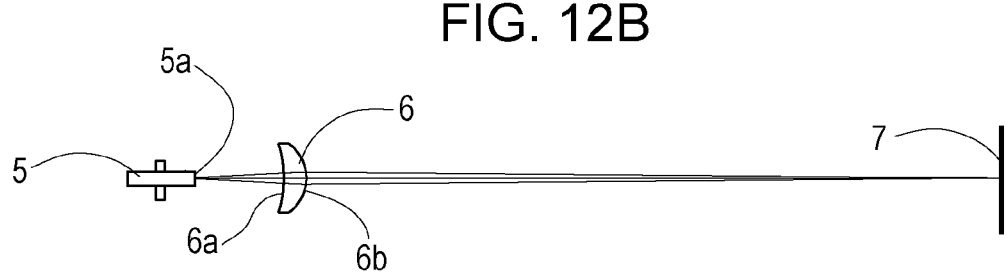

A light scanning apparatus according to a third embodiment of the present invention will be described in detail. FIGS. 12A and 12B are cross-sectional views of principal portions of the light scanning apparatus according to the present embodiment, where FIG. 12A illustrates a main scanning section, and FIG. 12B a sub-scanning section.

The light scanning apparatus according to the present embodiment is a light scanning apparatus having an A3-size printing region, unlike the light scanning apparatuses according to the first and second embodiments. The lens surface of the coupling lens 3 according to the present embodiment has an aspherical shape, enabling removal of spherical aberration occurring at the coupling lens 3 and reduction in image plane curvature when using multi beams. Note however, that an aspherical shape of the lens surface of the coupling lens 3 has no bearing on the present invention, so this may be the same as that of the first embodiment.

Negative refractive force is imparted to the anamorphic lens 4 according to the present embodiment at the main scanning section, so as to input divergent light into the imaging lens 6, the same as in the second embodiment. However, the refractive power of the anamorphic lens 4 according to the present embodiment is greater than the refractive power of the anamorphic lens 4 according to the second embodiment. Accordingly, the imaging lens 6 according to the present embodiment is configured so as to correct generation of negative image plane curvature greater than that of the second embodiment, in order to correct positive image plane curvature on the scanned surface 7. Table 3 illustrates the configuration of the light scanning apparatus according to the present embodiment.

TABLE 3

| Incident optical system configuration/imaging optical system layout | | | | | Imaging lens data | |
|---|---|---|---|---|---|---|
| | | | | | Surface 6a | Surface 6b |
| Light source wavelength | λ(nm) | 790 | | | | |
| Thickness of laser cover glass | dcg(mm) | 0.25000 | Generatrix | R | 4.81584E+03 | −9.57535E+01 |
| Refraction index of laser cover glass | n0 | 1.51052 | | Ky | 0.00000E+00 | 0.00000E+00 |
| Distance from light emission point to aperture diaphragm | d0(mm) | 17.08500 | | B2u | 0.00000E+00 | 0.00000E+00 |
| Distance from light emission point to first surface of coupling lens | d1(mm) | 18.38500 | | B4u | −2.14942E−06 | −1.14405E−06 |
| Curvature radius of first surface of coupling lens | R1(mm) | ∞ | | B6u | 1.06548E−09 | −1.63119E−10 |
| Curvature radius of second surface of coupling lens | R2(mm) | −15.23333 | | B8u | −1.75548E−13 | 1.89282E−13 |
| Aspherical surface coefficient of second surface of coupling lens | C4 | 2.56270E−05 | | B10u | 2.92148E−17 | 6.21629E−17 |
| Thickness of coupling lens | d2(mm) | 3.00000 | | B12u | 0.00000E+00 | 0.00000E+00 |
| Refraction index of coupling lens | n1 | 1.76167 | | B2l | 0.00000E+00 | 0.00000E+00 |
| Distance from second surface of coupling lens to first surface of anamorphic lens | d3(mm) | 13.46500 | | B4l | −3.35241E−06 | −2.00227E−06 |
| Sub-scanning curvature radius of first surface of anamorphic lens | Rs3(mm) | 26.99300 | | B6l | 3.36895E−09 | 6.70733E−10 |
| Main scanning curvature radius of first surface of anamorphic lens | Rm3(mm) | −528.39828 | | B8l | −3.26550E−12 | −2.03693E−13 |
| Sub-scanning curvature radius of second surface of anamorphic lens | Rs4(mm) | ∞ | | B10l | 9.11915E−16 | −7.25027E−16 |
| Main scanning curvature radius of second surface of anamorphic lens | Rm4(mm) | ∞ | | B12l | 0.00000E+00 | 0.00000E+00 |
| Thickness of anamorphic lens | d4(mm) | 6.00000 | Sagittal | r | −4.50311E+01 | −1.25397E+01 |
| Refraction index of anamorphic lens | n2 | 1.51052 | | kz | 0.00000E+00 | 0.00000E+00 |
| Distance from second surface of anamorphic lens to on-axis deflection surface (5a) | d5(mm) | 49.15000 | | E2u | −7.38257E−04 | −1.41428E−05 |
| Distance from on-axis deflection surface (5a) to first surface of imaging lens (6a) | d6(mm) | 30.00000 | | E4u | −8.29809E−07 | −5.33307E−07 |
| Thickness of imaging lens (6a to 6b) | d(mm) | 7.00000 | | E6u | 4.72246E−09 | 3.39853E−10 |
| Refraction index of imaging lens | n3 | 1.52397 | | E8u | −6.37448E−12 | 3.68045E−13 |
| Distance from second surface of imaging lens (6b) to scan surface (7) | Sk(mm) | 213.00000 | | E10u | 2.51341E−15 | −5.52296E−16 |
| Main scanning focal point distance of imaging lens | fm(mm) | 179.37276 | | E12u | 0.00000E+00 | 0.00000E+00 |
| Amount of Y-direction decentering of optical axis at imaging lens | ΔY(mm) | 0.00000 | | E14u | 0.00000E+00 | 0.00000E+00 |
| Main scanning incident angle of rotating polygonal mirror of incident optical system | α | 70.00000 | | E2l | −2.74633E−03 | −3.04482E−04 |
| Printing range of photosensitive drum surface | W(mm) | ±156 | | E4l | 1.38717E−05 | 4.52558E−07 |
| Maximum scanning angle | $θ_{Max}$ | ±40.614546 | | E6l | −3.69885E−08 | 1.18074E−09 |
| Imaging coefficient at on-axis image height | K | 207.00000 | | E8l | 4.16772E−11 | −6.02208E−12 |
| Scanning property coefficient | B | 0.58824 | | E10l | −1.57401E−14 | 4.91506E−15 |
| Number of faces of polygonal mirror | men | 4 | | E12l | 0.00000E+00 | 0.00000E+00 |
| Center position of polygonal mirror (optical axis direction) | PX(mm) | −6.00655 | | E14l | 0.00000E+00 | 0.00000E+00 |
| Center position of polygonal mirror (main scanning direction) | PY(mm) | −3.74978 | | M0,2 | 0.00000E+00 | 0.00000E+00 |

TABLE 3-continued

| | | | | Imaging lens data | |
|---|---|---|---|---|---|
| Incident optical system configuration/imaging optical system layout | | | | Surface 6a | Surface 6b |
| Radius of circumscribed circle of polygonal mirror | Rpol | 10.00000 | M1,2 | −1.12962E−04 | −7.46337E−05 |
| Aperture diameter (main scanning × sub scanning) | ellipse(mm) | 3.80 × 4.40 | M0,3 | 0.00000E+00 | 0.00000E+00 |
| * Refraction index measured at wavelength of 790 nm | | | M1,3 | 0.00000E+00 | 0.00000E+00 |
| | | | M0,4 | −2.41330E−05 | 3.80264E−05 |
| | | | M1,4 | 0.00000E+00 | 0.00000E+00 |

FIGS. 13 through 16B illustrate specific imaging performance and printing performance in the light scanning apparatus according to the present embodiment, in the same way as with the first embodiment.

Figure 13:
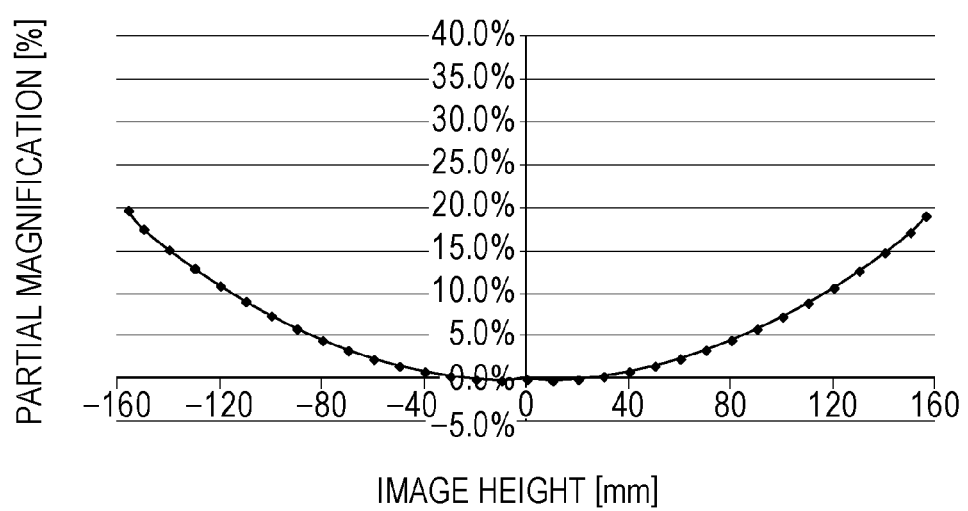
FIG. 13 is a diagram illustrating partial magnification shift as to Y=K$\theta$ in the third embodiment.

The present embodiment has a configuration where the difference between refractive power at the main scanning section as to the on-axis image height and refractive power at the main scanning section as to off-axis image height is greater that in the second embodiment. The partial magnification shift at the maximum off-axis height according to the present embodiment is dBY=0.197, as illustrated in FIG. 13. That is to say, the present embodiment has a configuration where the partial magnification shift is smaller than that of the second embodiment. Accordingly, the present embodiment needs less amount of electrical correction of scanning position as compared to the second embodiment, and electrical correction is easier. Also, the scanning property coefficient of the present embodiment is B=0.59 as shown in Table 3, thereby satisfying Expression (11) and further Expression (12), thus securing good imaging performance and printing performance.

Figure 14:
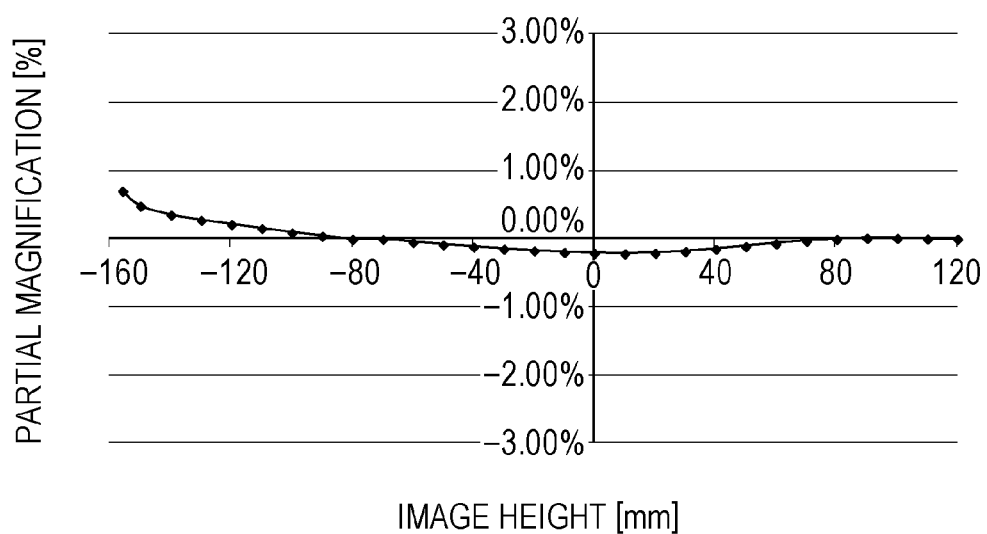
FIG. 14 is a diagram illustrating partial magnification shift after electric correction in the third embodiment.
Figure 15:
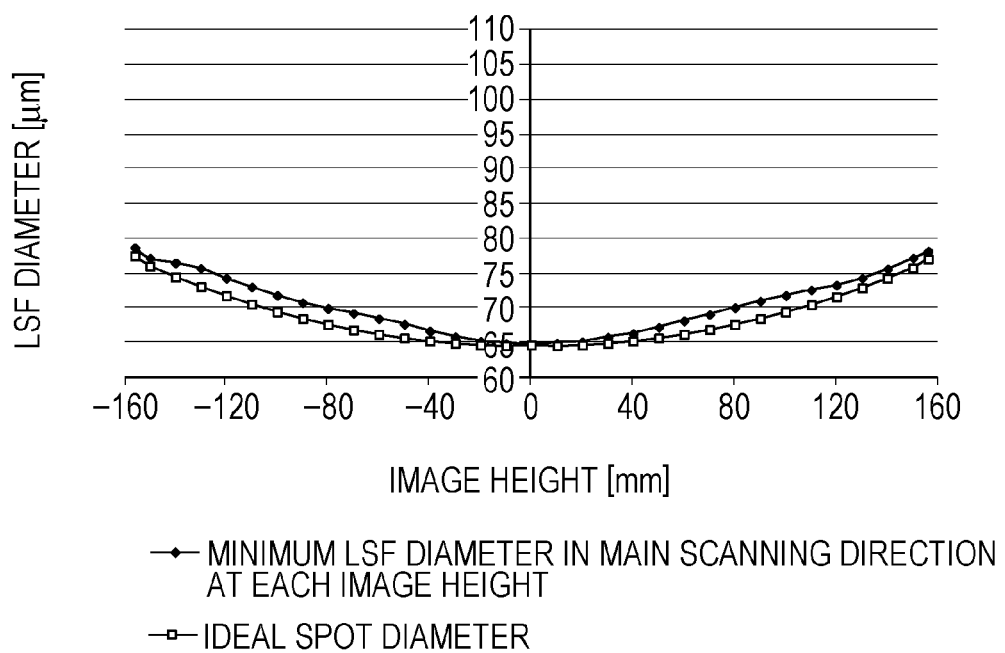
FIG. 15 is a diagram illustrating LSF diameter in the main scanning direction at each image height in the third embodiment.
Figure 16A:
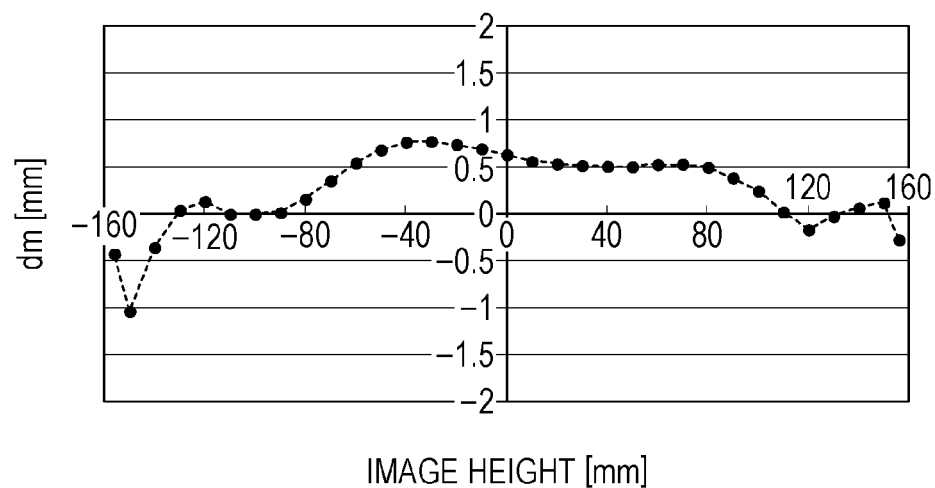
FIGS. 16A and 16B are diagrams illustrating image curvature on a scanned surface in the third embodiment.
Figure 16B:
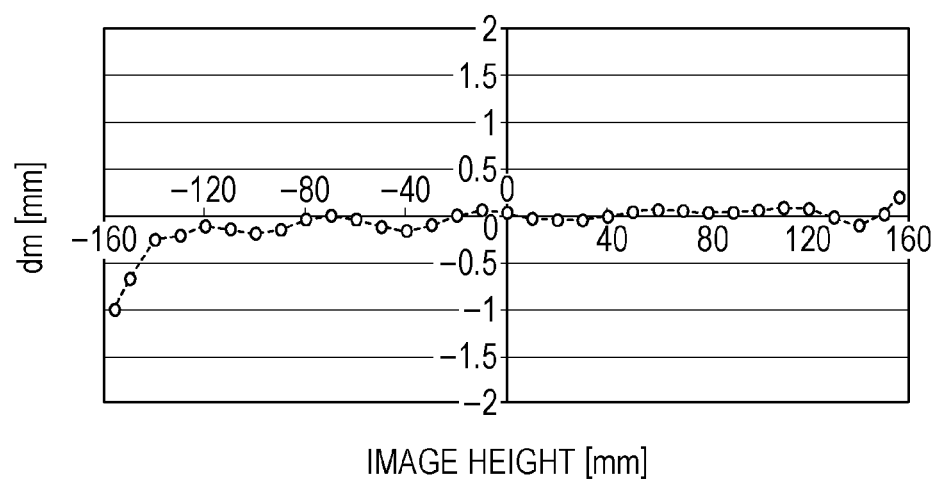

As illustrated in FIG. 14, the partial magnification shift after electric correction in the present embodiment is no more than 0.7% at the most, so it can be seen that good printing performance is secured. Also, the ideal LSF diameter and the LSF diameter according to the present embodiment generally match at each image height as illustrated in FIG. 15, so it can be seen that good imaging performance is secured at each image height. Further, it can be seen from FIGS. 16A and 16B that both the main scanning image plane curvature and sub-scanning image plane curvature on the scanned surface 7 are suitably corrected in the present embodiment as well.

Note that Sk=213, and fm=179.37 in the present embodiment as shown in Table 3, so the convergence value Sk/fm=1.19. This satisfies Expression (9) and the imaging lens 6 can be made thinner while ensuring good imaging performance. It can also be seen from Table 3 that T2=d6+d=37, so T2/Sk=0.17, so as to satisfy Expression (13) and further Expression (14), thereby achieving reduction in size of the light scanning apparatus while simultaneously realizing good imaging performance and printing performance. Moreover, d=7 and K=207 in the present embodiment as shown in Table 3, so d/K=0.034, which satisfies Expression (15). It can thus be seen that the thickness of the imaging lens 6 of the light scanning apparatus according to the present embodiment has been suitably selected in accordance with the printing size, and that the configuration has a thinner imaging lens 6 than that of the first and second embodiments.

Thus, according to the light scanning apparatus of the present embodiment, low cost and reduction in size can be realized while ensuring good imaging performance and printing performance.

Fourth Embodiment

A light scanning apparatus according to a fourth embodiment of the present invention will be described. The configuration of the light scanning apparatus according to the present embodiment is generally the same as the configuration of the light scanning apparatus according to the third embodiment, but differs from the third embodiment with regard to the point that positive refractive force is imparted to the anamorphic lens 4 at the main scanning section in the same way as with the first embodiment, so as to input convergent light into the imaging lens 6. Note that the positive refractive power of the anamorphic lens 4 according to the present embodiment is greater than the positive refractive power of the anamorphic lens 4 according to the first embodiment. Table 4 illustrates the configuration of the light scanning apparatus according to the present embodiment.

TABLE 4

| | | | | Imaging lens data | |
|---|---|---|---|---|---|
| Incident optical system configuration/imaging optical system layout | | | | Surface 6a | Surface 6b |
| Light source wavelength | λ(nm) | 790 | | | |
| Thickness of laser cover glass | dcg(mm) | 0.25000 | Generatrix R | 1.47243E+02 | −8.24341E+02 |
| Refraction index of laser cover glass | n0 | 1.51052 | Ky | 0.00000E+00 | 1.33133E+01 |
| Distance from light emission point to aperture diaphragm | d0(mm) | 17.08500 | B2u | 0.00000E+00 | 0.00000E+00 |
| Distance from light emission point to first surface of coupling lens | d1(mm) | 18.38500 | B4u | −1.24691E−06 | −5.79789E−07 |
| Curvature radius of first surface of coupling lens | R1(mm) | ∞ | B6u | 1.30588E−10 | −1.58682E−10 |
| Curvature radius of second surface of coupling lens | R2(mm) | −15.23333 | B8u | 1.55839E−14 | 5.58243E−14 |
| Aspherical surface coefficient of second surface of coupling lens | C4 | 2.56270E−05 | B10u | −3.96292E−18 | −5.09999E−18 |
| Thickness of coupling lens | d2(mm) | 3.00000 | B12u | 0.00000E+00 | 0.00000E+00 |
| Refraction index of coupling lens | n1 | 1.76167 | B2l | 0.00000E+00 | 0.00000E+00 |
| Distance from second surface of coupling lens to first surface of anamorphic lens | d3(mm) | 13.46500 | B4l | −1.24691E−06 | −5.88546E−07 |
| Sub-scanning curvature radius of first surface of anamorphic lens | Rs3(mm) | 26.99300 | B6l | 1.30588E−10 | −1.43337E−10 |

TABLE 4-continued

| Incident optical system configuration/imaging optical system layout | | | Imaging lens data | |
|---|---|---|---|---|
| | | | Surface 6a | Surface 6b |
| Main scanning curvature radius of first surface of anamorphic lens | Rm3(mm) | 686.29077 | B8l | 1.55839E−14 | 4.85970E−14 |
| Sub-scanning curvature radius of second surface of anamorphic lens | Rs4(mm) | ∞ | B10l | −3.96292E−18 | −3.95265E−18 |
| Main scanning curvature radius of second surface of anamorphic lens | Rm4(mm) | ∞ | B12l | 0.00000E+00 | 0.00000E+00 |
| Thickness of anamorphic lens | d4(mm) | 6.00000 | Sagittal r | −3.76311E+01 | −1.51753E+01 |
| Refraction index of anamorphic lens | n2 | 1.51052 | kz | 0.00000E+00 | 0.00000E+00 |
| Distance from second surface of anamorphic lens to on-axis deflection surface (5a) | d5(mm) | 49.15000 | E2u | 3.09061E−04 | 1.55923E−04 |
| Distance from on-axis deflection surface (5a) to first surface of imaging lens (6a) | d6(mm) | 45.00000 | E4u | 7.81797E−07 | 9.70295E−08 |
| Thickness of imaging lens (6a to 6b) | d(mm) | 9.50000 | E6u | −3.02696E−10 | −4.27306E−11 |
| Refraction index of imaging lens | n3 | 1.52397 | E8u | 2.22290E−13 | 2.90940E−15 |
| Distance from second surface of imaging lens (6b) to scan surface (7) | Sk(mm) | 195.50000 | E10u | −5.96371E−17 | 0.00000E+00 |
| Main scanning focal point distance of imaging lens | fm(mm) | 239.20466 | E12u | 0.00000E+00 | 0.00000E+00 |
| Amount of Y-direction decentering of optical axis at imaging lens | ΔY(mm) | 0.00000 | E14u | 0.00000E+00 | 0.00000E+00 |
| Main scanning incident angle of rotating polygon mirror of incident optical system | α | 70.00000 | E2l | 3.56826E−04 | 1.73693E−04 |
| Printing range of photosensitive drum surface | W(mm) | ±156 | E4l | 1.09793E−06 | 1.45969E−07 |
| Maximum scanning angle | $\theta_{Max}$ | ±41.794 | E6l | −4.32447E−10 | −5.60970E−11 |
| Imaging coefficient at on-axis image height | K | 209.00000 | E8l | 4.28105E−13 | 3.23560E−15 |
| Scanning property coefficient | B | 0.35714 | E10l | −6.60837E−17 | 0.00000E+00 |
| Number of faces of polygonal mirror | men | 4 | E12l | 0.00000E+00 | 0.00000E+00 |
| Center position of polygonal mirror (optical axis direction) | PX(mm) | −6.00655 | E14l | 0.00000E+00 | 0.00000E+00 |
| Center position of polygonal mirror (main scanning direction) | PY(mm) | −3.74978 | M0,2 | 0.00000E+00 | 0.00000E+00 |
| Radius of circumscribed circle of polygonal mirror | Rpol | 10.00000 | M1,2 | 0.00000E+00 | 0.00000E+00 |
| Aperture diameter (main scanning × sub scanning) | ellipse(mm) | 3.80 × 2.60 | M0,3 | 0.00000E+00 | 0.00000E+00 |
| * Refraction index measured at wavelength of 790 nm | | | M1,3 | 0.00000E+00 | 0.00000E+00 |
| | | | M0,4 | 1.81265E−06 | 1.85124E−05 |
| | | | M1,4 | 0.00000E+00 | 0.00000E+00 |

In the present embodiment, a configuration is made where Sk=195.5, and fm=239.20 as shown in Table 4, so the convergence value Sk/fm=0.817, and a light flux of a smaller convergence value than in the first embodiment, i.e., a powerful convergence, is input to the imaging lens 6. Accordingly, the present embodiment satisfies Expression (9), thereby achieving a thinner imaging lens 6 while ensuring good imaging performance. The reason why the convergence value of the light flux input to the imaging lens 6 in the present embodiment is made smaller than that in the first embodiment will be described below.

It can be seen from Table 4 that T2=d6+d=54.5 in the present embodiment, so T2/Sk=0.279. That is to say, the imaging lens 6 according to the present embodiment is disposed at a position closer to the scanned surface 7 than the first through third embodiments. Having the imaging lens 6 closer to the scanned surface 7 enables the imaging magnification at the sub-scanning section to be reduced, which consequently enables main scanning image plane sensitivity and sub-scanning image plane sensitivity to be balanced.

At this time, unless the convergence value Sk/fm is made smaller, the scanning angle (maximum scanning field angle) for scanning the printing region on the scanned surface 7 becomes greater, leading to a greater diameter of the imaging lens 6. Accordingly, the convergence value Sk/fm in the present embodiment is made smaller than that of the other embodiments. The present embodiment satisfies Expression (13), and realizes reduction in size of the light scanning apparatus while achieving both imaging performance and printing performance. Normally, reducing the convergence value Sk/fm results in a greater partial magnification shift, the imaging lens 6 is situated closer to the scanned surface 7 in the present embodiment, so the partial magnification shift can be reduced.

FIGS. 17 through 20B illustrate specific imaging performance and printing performance in the light scanning apparatus according to the present embodiment, in the same way as with the first embodiment.

Figure 17:
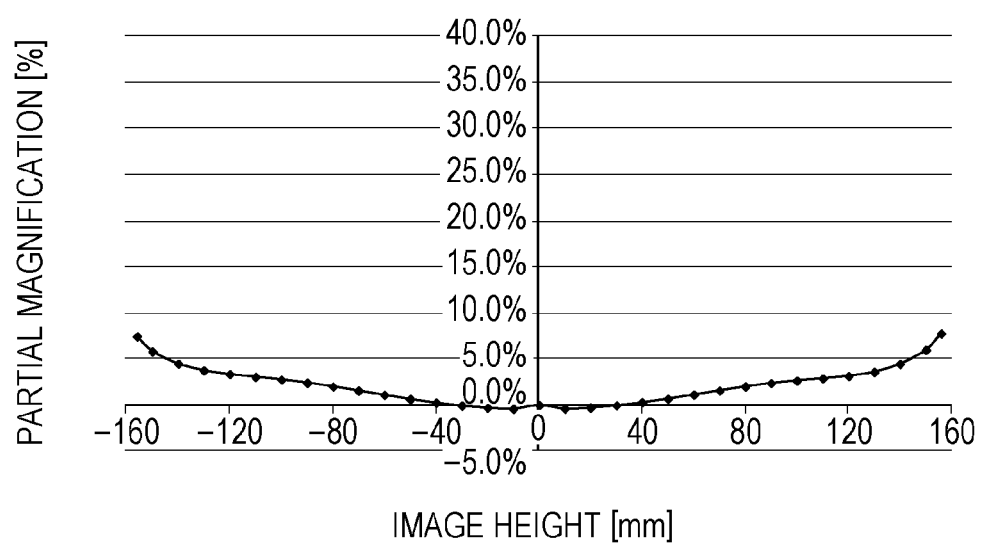
FIG. 17 is a diagram illustrating partial magnification shift as to Y=K$\theta$ in a fourth embodiment.

The partial magnification shift at the maximum off-axis height according to the present embodiment is dBY=0.072, as illustrated in FIG. 17. That is to say, the present embodiment has a configuration where the partial magnification shift is smaller than that of the other embodiments. Accordingly, the present embodiment needs less amount of electrical correction of scanning position as compared to the other embodiments, and electrical correction is easier. Also, the scanning property coefficient of the present embodiment is B=0.36 as shown in Table 4, thereby satisfying Expression (11), and yields scanning properties closer to the fθ properties as compared to the other embodiments. Accordingly, the present embodiment needs less amount of electrical correction of scanning position as compared to the other embodiments, and electrical correction is easier.

Figure 18:
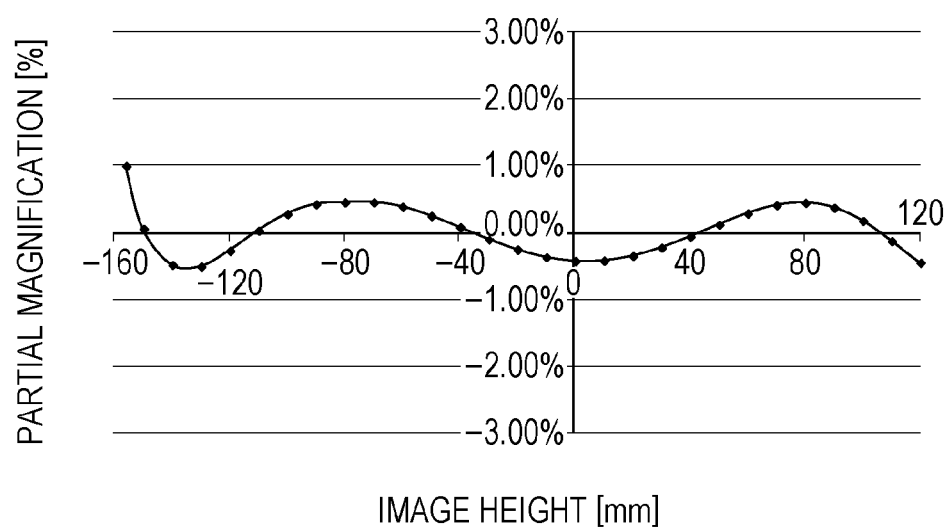
FIG. 18 is a diagram illustrating partial magnification shift after electric correction in the fourth embodiment.
Figure 19:
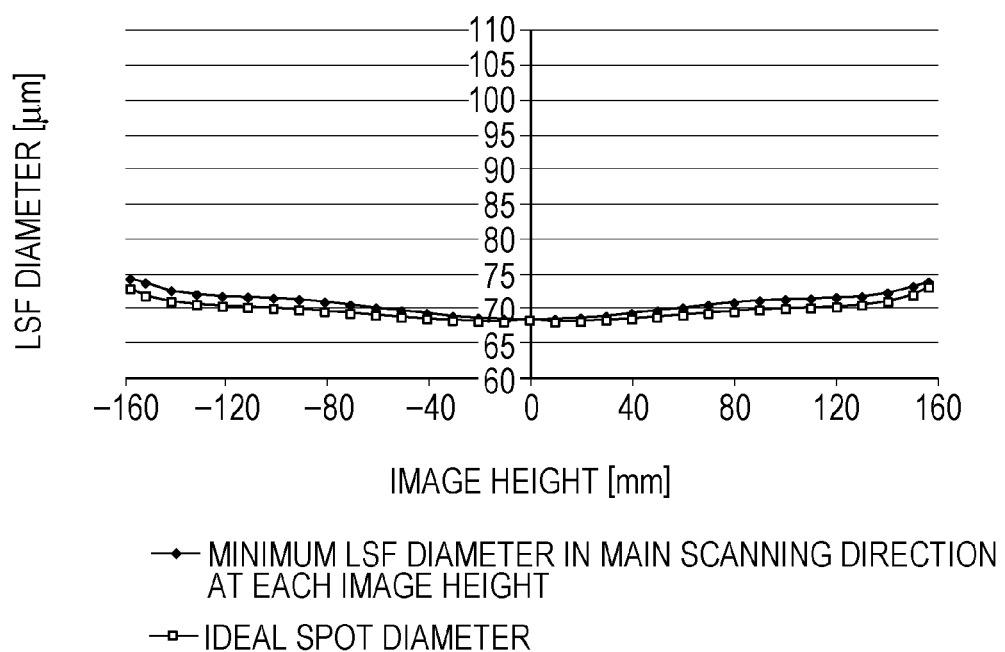
FIG. 19 is a diagram illustrating LSF diameter in the main scanning direction at each image height in the fourth embodiment.
Figure 20A:
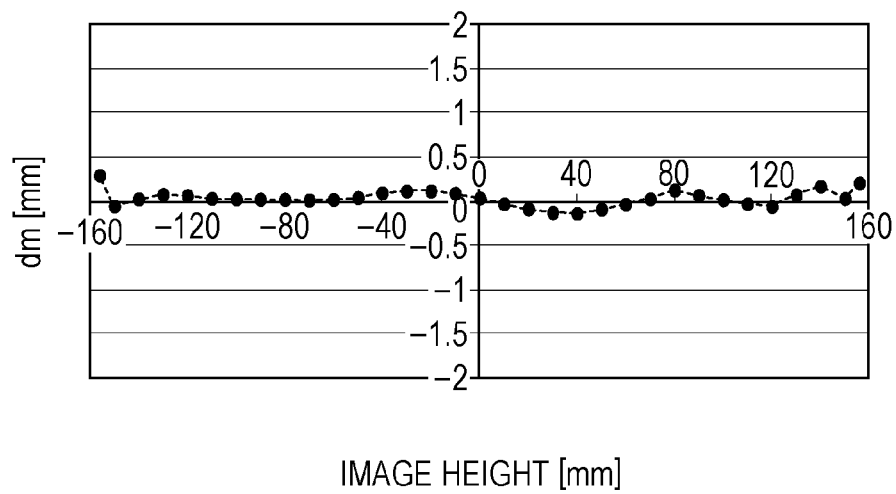
FIGS. 20A and 20B are diagrams illustrating image curvature on a scanned surface in the fourth embodiment.
Figure 20B:
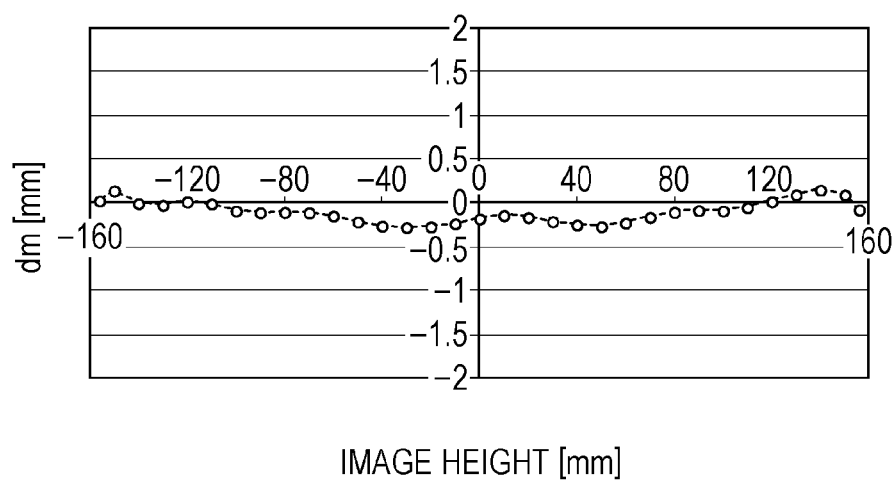

As illustrated in FIG. 18, the partial magnification shift after electric correction in the present embodiment is no more than 1.3% at the most, so it can be seen that good printing performance is secured. Also, the ideal LSF diameter and the LSF diameter according to the present embodiment generally match at each image height as illustrated in FIG. 19, so it can be seen that good imaging performance is secured at each image height. Further, it can be seen from FIGS. 20A and 20B that both the main scanning image plane curvature and sub-scanning image plane curvature on the scanned surface 7 are suitably corrected in the present embodiment as well.

Note that d=9.5 and K=209 according to the present embodiment as shown in Table 4, so d/K=0.046, which satisfies Expression (15) and further Expression (16). It can thus be seen that the thickness of the imaging lens 6 has been suitably selected in accordance with the printing size.

Thus, according to the light scanning apparatus of the present embodiment, low cost and reduction in size can be realized while ensuring good imaging performance and printing performance.

Fifth Embodiment

A light scanning apparatus according to a fifth embodiment of the present invention will be described in detail. The configuration of the light scanning apparatus according to the present embodiment is generally the same as the configuration of the light scanning apparatus according to the fourth embodiment, and is the same as the fourth embodiment with regard to the point that positive refractive force is imparted to the anamorphic lens 4, at the main scanning section, so as to input convergent light into the imaging lens 6. The positive refractive power of the anamorphic lens 4 according to the present embodiment, though, is weaker than the positive refractive power of the anamorphic lens 4 according to the fourth embodiment. Table 5 illustrates the configuration of the light scanning apparatus according to the present embodiment.

TABLE 5

| Incident optical system configuration/imaging optical system layout | | | | | Imaging lens data | |
|---|---|---|---|---|---|---|
| | | | | | Surface 6a | Surface 6b |
| Light source wavelength | μ(nm) | 790 | | | | |
| Thickness of laser cover glass | dcg(mm) | 0.25000 | Generatrix | R | 1.95446E+02 | −3.36241E+02 |
| Refraction index of laser cover glass | n0 | 1.51052 | | Ky | 0.00000E+00 | 1.56919E+01 |
| Distance from light emission point to aperture diaphragm | d0(mm) | 17.08500 | | B2u | 0.00000E+00 | 0.00000E+00 |
| Distance from light emission point to first surface of coupling lens | d1(mm) | 18.38500 | | B4u | −1.21721E−06 | −5.36056E−07 |
| Curvature radius of first surface of coupling lens | R1(mm) | ∞ | | B6u | 1.03691E−10 | −1.94373E−10 |
| Curvature radius of second surface of coupling lens | R2(mm) | −15.23333 | | B8u | 9.42811E−15 | 5.57633E−14 |
| Aspherical surface coefficient of second surface of coupling lens | C4 | 2.56270E−05 | | B10u | −3.66316E−18 | −1.02588E−17 |
| Thickness of coupling lens | d2(mm) | 3.00000 | | B12u | 0.00000E+00 | 0.00000E+00 |
| Refraction index of coupling lens | n1 | 1.76167 | | B2l | 0.00000E+00 | 0.00000E+00 |
| Distance from second surface of coupling lens to first surface of anamorphic lens | d3(mm) | 13.46500 | | B4l | −1.32842E−06 | −6.45515E−07 |
| Sub-scanning curvature radius of first surface of anamorphic lens | Rs3(mm) | 26.99300 | | B6l | 1.68496E−10 | −1.31427E−10 |
| Main scanning curvature radius of first surface of anamorphic lens | Rm3(mm) | 726.94820 | | B8l | 3.32010E−15 | 3.81099E−14 |
| Sub-scanning curvature radius of second surface of anamorphic lens | Rs4(mm) | ∞ | | B10l | −2.69925E−18 | −3.74617E−18 |
| Main scanning curvature radius of second surface of anamorphic lens | Rm4(mm) | ∞ | | B12l | 0.00000E+00 | 0.00000E+00 |
| Thickness of anamorphic lens | d4(mm) | 6.00000 | Sagittal | r | −6.42073E+01 | −1.67881E+01 |
| Refraction index of anamorphic lens | n2 | 1.51052 | | kz | 0.00000E+00 | 0.00000E+00 |
| Distance from second surface of anamorphic lens to on-axis deflection surface (5a) | d5(mm) | 49.15000 | | E2u | −4.56075E−04 | 5.36364E−05 |
| Distance from on-axis deflection surface (5a) to first surface of imaging lens (6a) | d6(mm) | 43.00000 | | E4u | 2.19802E−06 | 1.54594E−07 |
| Thickness of imaging lens (6a to 6b) | d(mm) | 9.50000 | | E6u | −2.13233E−09 | −4.69246E−11 |
| Refraction index of imaging lens | n3 | 1.52397 | | E8u | 1.73592E−12 | −6.17186E−15 |
| Distance from second surface of imaging lens (6b) to scan surface (7) | Sk(mm) | 197.50000 | | E10u | −5.22891E−16 | −9.68623E−19 |
| Main scanning focal point distance of imaging lens | fm(mm) | 237.22689 | | E12u | 0.00000E+00 | 0.00000E+00 |
| Amount of Y-direction decentering of optical axis at imaging lens | ΔY(mm) | 0.10000 | | E14u | 0.00000E+00 | 0.00000E+00 |
| Main scanning incident angle of rotating polygonal mirror of incident optical system | α | 70.00000 | | E2l | −3.59904E−04 | 7.70465E−05 |
| Printing range of photosensitive drum surface | W(mm) | ±156 | | E4l | 3.32675E−06 | 2.96233E−07 |
| Maximum scanning angle | $\theta_{Max}$ | ±41.230 | | E6l | −3.65733E−09 | −1.67965E−10 |
| Imaging coefficient at on-axis image height | K | 210.00000 | | E8l | 3.70292E−12 | 1.57270E−14 |
| Scanning property coefficient | B | 0.45455 | | E10l | −1.31350E−15 | 1.10029E−18 |
| Number of faces of polygonal mirror | men | 4 | | E12l | 0.00000E+00 | 0.00000E+00 |
| Center position of polygonal mirror (optical axis direction) | PX(mm) | −6.00655 | | E14l | 0.00000E+00 | 0.00000E+00 |
| Center position of polygonal mirror (main scanning direction) | PY(mm) | −3.74978 | | M0,2 | 0.00000E+00 | 0.00000E+00 |
| Radius of circumscribed circle of polygonal mirror | Rpol | 10.00000 | | M1,2 | 0.00000E+00 | 0.00000E+00 |
| Aperture diameter (main scanning × sub scanning) | ellipse(mm) | 3.80 × 2.60 | | M0,3 | 0.00000E+00 | 0.00000E+00 |
| * Refraction index measured at wavelength of 790 nm | | | | M1,3 | 0.00000E+00 | 0.00000E+00 |
| | | | | M0,4 | −1.31070E−04 | −6.42550E−05 |
| | | | | M1,4 | 0.00000E+00 | 0.00000E+00 |

In the present embodiment, Sk=197.5, and fm=237.23 as shown in Table 5, so the convergence value Sk/fm=0.833, and a light flux of a greater convergence value than in the fourth embodiment, i.e., a weaker convergence, is input to the imaging lens 6. Accordingly, the present embodiment satisfies Expression (9), thereby achieving a thinner imaging lens 6 while ensuring good imaging performance.

It can be seen from Table 5 that T2=d6+d=52.5 in the present embodiment, so T2/sk=0.266. That is to say, the imaging lens 6 according to the present embodiment is disposed at a position closer to the deflecting surface 5a than the fourth embodiment, and closer to the scanned surface 7 than the third embodiment. Accordingly, the diameter of the imaging lens 6 can be made smaller than the fourth embodiment, which is a configuration that enables main scanning image plane sensitivity and sub-scanning image plane sensitivity to be better balanced than the third embodiment. The present embodiment satisfies Expression (13) and further Expression (14), and realizes reduction in size of the light scanning apparatus while achieving both imaging performance and printing performance.

FIGS. 21 through 24B illustrate specific imaging performance and printing performance in the light scanning apparatus according to the present embodiment, in the same way as with the first embodiment.

Figure 21:
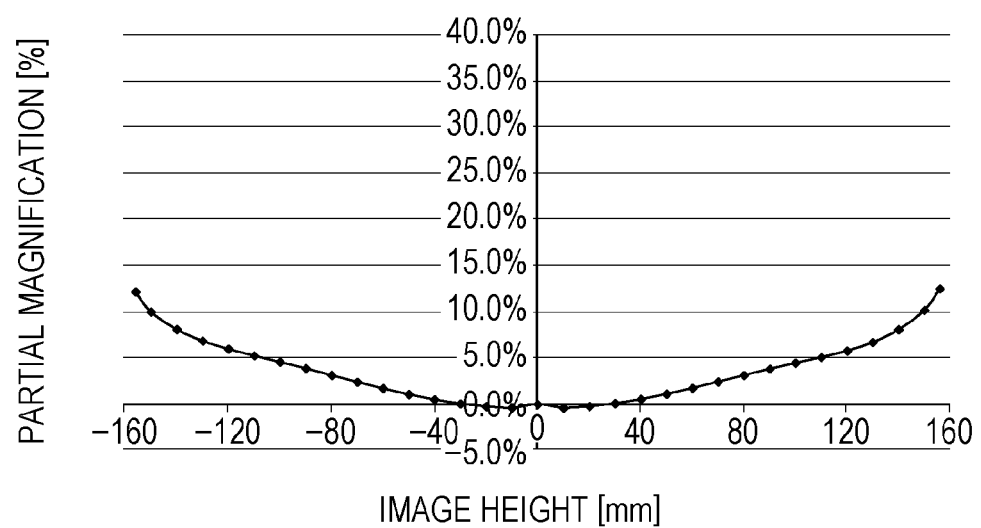
FIG. 21 is a diagram illustrating partial magnification shift as to Y=K$\theta$ in a fifth embodiment.

The partial magnification shift at the maximum off-axis height according to the present embodiment is dBY=0.125, as illustrated in FIG. 21. That is to say, the present embodiment has a configuration where the partial magnification shift is smaller than that of the first through third embodiments. Accordingly, the present embodiment can secure imaging performance easier than the fourth embodiment, and electrical correction is easier as compared to the third embodiment. Also, the scanning property coefficient of the present embodiment is B=0.45 as shown in Table 5, thereby satisfying Expression (11) and further Expression (12), and ensures good imaging performance and printing performance.

Figure 22:
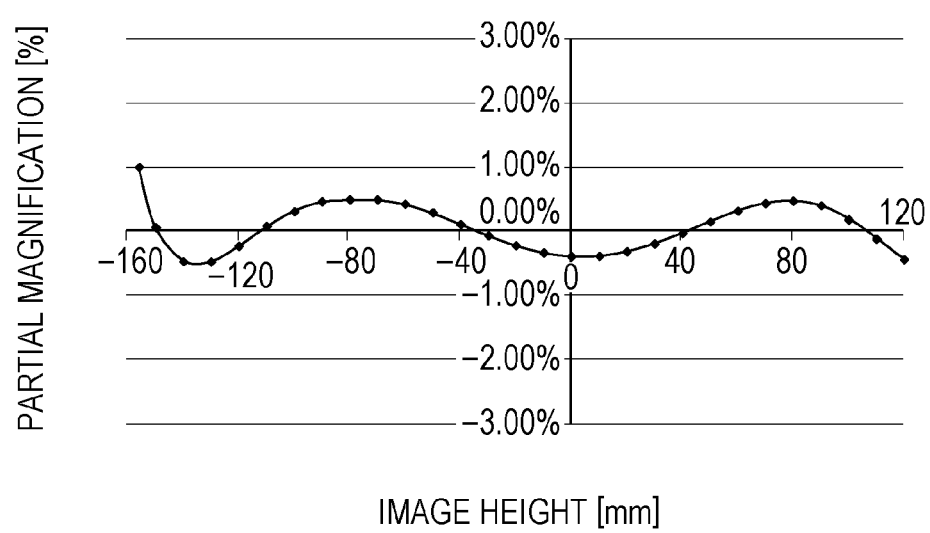
FIG. 22 is a diagram illustrating partial magnification shift after electric correction in the fifth embodiment.
Figure 23:
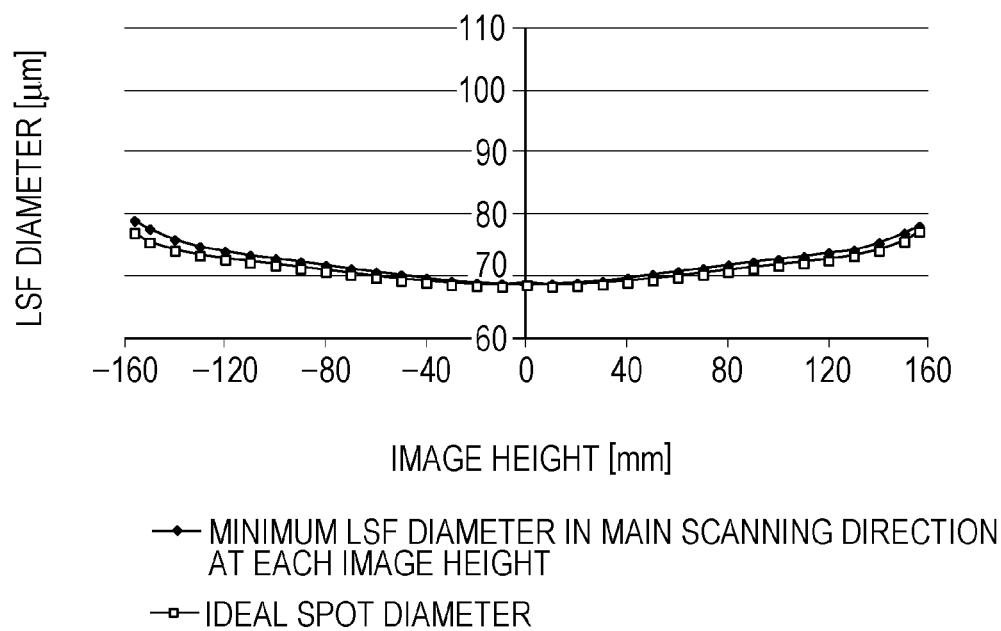
FIG. 23 is a diagram illustrating LSF diameter in the main scanning direction at each image height in the fifth embodiment.
Figure 24A:
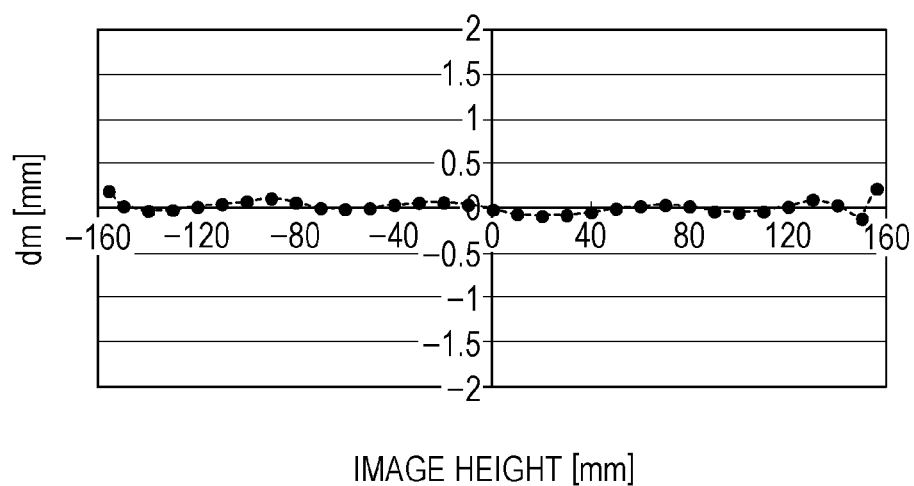
FIGS. 24A and 24B are diagrams illustrating image curvature on a scanned surface in the fifth embodiment.
Figure 24B:
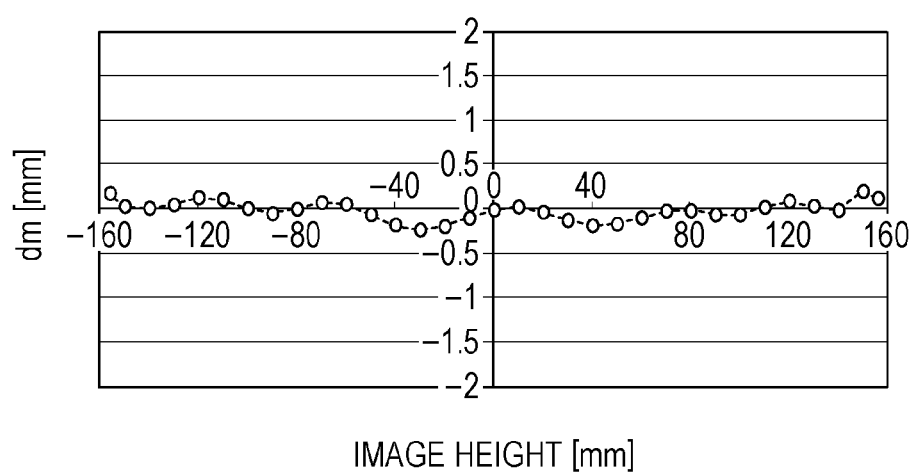

As illustrated in FIG. 22, the partial magnification shift after electric correction in the present embodiment is no more than 1.3% at the most, so it can be seen that good printing performance is secured. Also, the ideal LSF diameter and the LSF diameter according to the present embodiment generally match at each image height as illustrated in FIG. 23, so it can be seen that good imaging performance is secured at each image height. Further, it can be seen from FIGS. 24A and 24B that both the main scanning image plane curvature and sub-scanning image plane curvature on the scanned surface 7 are suitably corrected in the present embodiment as well.

Note that d=9.5 and K=210 in the present embodiment as shown in Table 5, so d/K=0.045, which satisfies Expression (15) and further Expression (16). It can thus be seen that the thickness of the imaging lens 6 has been suitably selected in accordance with the printing size.

Thus, according to the light scanning apparatus of the present embodiment, low cost and reduction in size can be realized while ensuring good imaging performance and printing performance.

Image Forming Apparatus

Figure 26:
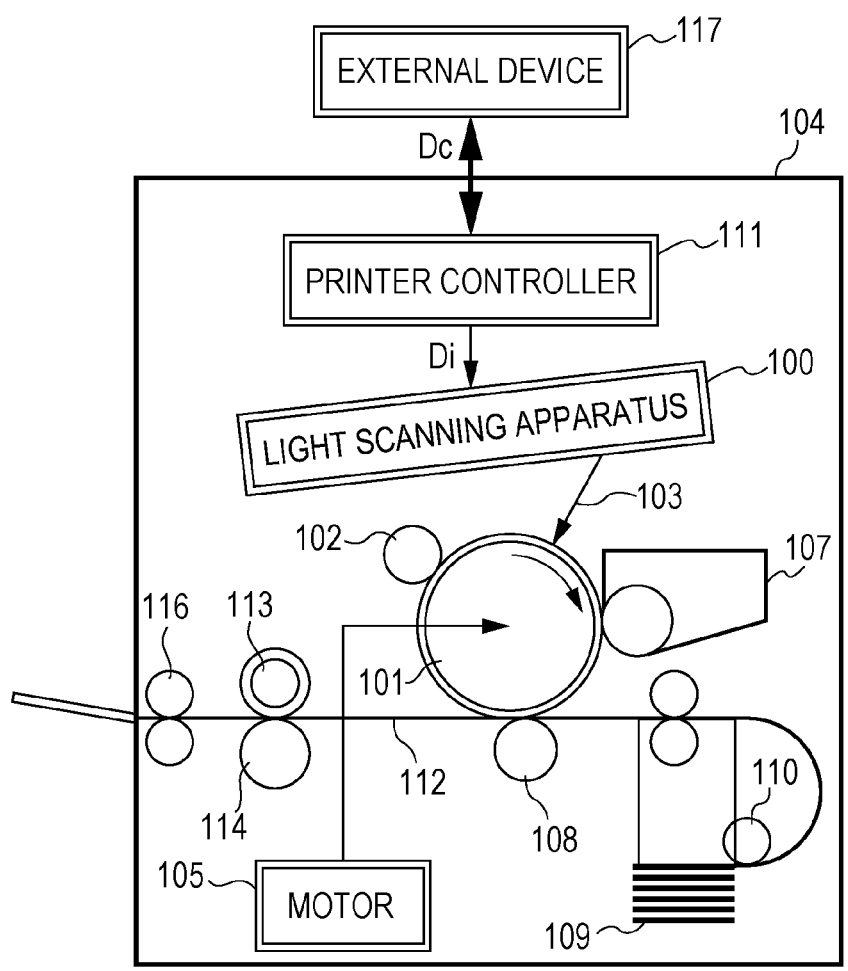
FIG. 26 is a schematic diagram illustrating principal portions of an image forming apparatus according to an embodiment of the present invention.

FIG. 26 is a schematic diagram (sub-scanning cross-section) of principal portions of an image forming apparatus 104 according to an embodiment of the present invention. The image forming apparatus 104 includes a light scanning apparatus (light scanning unit) 100 according to one of the above-described embodiments.

As illustrated in FIG. 26, the image forming apparatus 104 receives input of code data Dc from an external device 117 such as a personal computer or the like. This code data Dc is converted into image signals (dot data) Di by a printer controller 111 within the apparatus. The image signals Di are input to the light scanning apparatus 100 according to one of the above-described embodiments. A light flux 103 which has been modulated in accordance with the image signals Di is emitted from the light scanning apparatus 100, and a photosensitive surface (scanned surface) of a photosensitive drum 101 is scanned in the main scanning direction by the light flux 103. The printer controller 111 performs control of various parts within the image forming apparatus such as a later-described motor 115, not only the above-described data conversion.

The photosensitive drum 101 serving as an electrostatic image bearing member (photosensitive member) is rotated clockwise by the motor 115. The photosensitive surface of the photosensitive drum 101 moves in the sub-scanning direction as to the light flux 103 due to this rotation. A charging roller 102 which uniformly charges the photosensitive surface is provided above the photosensitive drum 101, so as to be in contact therewith. The photosensitive surface charged by the charging roller 102 is irradiated by the light flux 103 from the light scanning apparatus 100.

The light flux 103 has been modulated based on the image signals Di as mentioned earlier, so irradiation of the photosensitive surface by the light flux 103 forms an electrostatic latent image on the photosensitive surface. This electrostatic latent image is developed as a toner image by a developer 107 which is disposed in contact with the photosensitive surface downstream in the rotation direction of the photosensitive drum 101 from the irradiation position of the light flux 103.

The toner image developed by the developer 107 is transferred onto a sheet 112 serving as a transfer material, by a transfer roller (transfer unit) 108 disposed downstream of the photosensitive drum 101 so as to face the photosensitive drum 101. The sheet 112 is stored in a sheet cassette 109 upstream of the photosensitive drum 101 (to the right side in FIG. 26), but manual sheet feed may be performed as well. A feed roller 110 is disposed at the edge of the sheet cassette 109, whereby the sheets 112 within the sheet cassette 109 are fed to a conveyance path.

The sheet 112 onto which an unfixed toner image has been transferred as described above is further conveyed to a fixing device downstream of the photosensitive drum 101 (to the left side in FIG. 26). The fixing device has a fixing roller 113 which internally includes a fixing heater (omitted from illustration), and a pressurizing roller 114 disposed so as to press against the fixing roller 113. The fixing device presses the sheet 112 conveyed from the transfer roller 108 at a pressurizing portion of the fixing roller 113 and the pressurizing roller 114, while heating, thereby fixing the unfixed toner image on the sheet 112. Further, a discharge roller pair 116 is disposed downstream of the fixing roller 113, whereby the sheet 112 upon which the toner image has been fixed is externally discharged from the image forming apparatus 104.

MODIFICATIONS

While embodiments of the present invention have been described, the present invention is not restricted to these embodiments; rather, various modifications and variations may be made within the scope of the essence of the invention.

For example, an arrangement may be made in the light scanning apparatus according to the above-described embodiments, where a reflecting member (reflecting mirror) is disposed on the optical path between the imaging lens 6 and the scanned surface 7, so as to deflect the light flux which has passed through the imaging lens 6 and guide onto the scanned surface. Also, an arrangement may be made where the incident optical system is configured such that the light flux from the light source 1 is input obliquely to the deflecting surface 5a, at the sub-scanning section.

While the present invention has been described with reference to exemplary embodiments, it is to be understood that the invention is not limited to the disclosed exemplary embodiments.

This application claims the benefit of Japanese Patent Application No. 2013-161329, filed Aug. 2, 2013, which is hereby incorporated by reference herein in its entirety.

What is claimed is:

1. A light scanning apparatus comprising:
a light source;
a deflector configured to deflect a light flux from the light source; and
an imaging optical system configured to guide the light flux deflected at the deflector onto a scanned surface;
wherein the imaging optical system consists of a single imaging optical element;
wherein, on the optical axis of the imaging optical system, the following conditions are satisfied $0.15 \leq T2/Sk \leq 0.3$ $0.03 \leq d/K \leq 0.08$ where T2 represents the distance from a deflecting surface of the deflector to an exit surface of the imaging optical element, Sk represents the distance from the exit surface of the imaging optical element to the scanned surface, d represents the thickness of the imaging optical element, and K represents an imaging coefficient on the optical axis of the imaging optical element,
and wherein the condition $0.3 \leq B \leq 0.6$ is satisfied at an image height Y where a scanning angle $\theta$ is greatest, when the image height Y in the main scanning direction on the scanned surface to which the light flux deflected at the scanning angle $\theta$ by the deflector enters is expressed by $Y=(K/B)\times\tan(B\times\theta)$ where B is a scanning properties coefficient.

2. The light scanning apparatus according to claim 1, wherein the following conditions are satisfied $0.8 \leq Sk/fm \leq 1.2$ where fm represents the focal distance of the imaging optical element in the main scanning direction.

3. The light scanning apparatus according to claim 2, wherein the following conditions are satisfied $0.9 \leq Sk/fm \leq 1.1$.

4. The light scanning apparatus according to claim 1, wherein the following conditions are satisfied when the scanning angle $\theta$ is greatest $0.07 \leq \tan^2(B\times\theta) \leq 0.5$.

5. The light scanning apparatus according to claim 1, wherein the following conditions are satisfied at the image height Y when the scanning angle $\theta$ is greatest $0.45 \leq B \leq 0.6$.

6. The light scanning apparatus according to claim 1, wherein the following conditions are satisfied $0.15 \leq T2/Sk \leq 0.27$.

7. The light scanning apparatus according to claim 1, wherein the following conditions are satisfied $0.04 \leq d/K \leq 0.07$.

8. The light scanning apparatus according to claim 1, further comprising:
a control unit configured to control modulation timing of the light source, in accordance with partial magnification shift of the imaging optical element, expressed by $\tan^2(B\times\theta)$.

9. An image forming apparatus comprising:
a light scanning apparatus including
a light source,
a deflector configured to deflect a light flux from the light source, and
an imaging optical system configured to guide the light flux deflected at the deflector onto a scanned surface;
a photosensitive member disposed on the scanned surface;
a developer configured to develop an electrostatic latent image, formed on a photosensitive surface of the photosensitive member by the light scanning apparatus, as a toner image;
a transfer unit configured to transfer the developed toner image onto a transfer material; and
a fixing device configured to fix the transferred toner image onto the transfer material;
wherein the imaging optical system is configured including a single imaging optical element;
wherein, on the optical axis of the imaging optical system, the following conditions are satisfied $0.15 \leq T2/Sk \leq 0.3$ $0.03 \leq d/K \leq 0.08$ where T2 represents the distance from a deflecting surface of the deflector to an exit surface of the imaging optical element, Sk represents the distance from the exit surface of the imaging optical element to the scanned surface, d represents the thickness of the imaging optical element, and K represents an imaging coefficient at an on-axis image height of the imaging optical element,
and wherein the condition $0.3 \leq B \leq 0.6$ is satisfied at an image height Y where a scanning angle $\theta$ is greatest, when the image height Y in the main scanning direction on the scanned surface to which the light flux deflected at the scanning angle $\theta$ by the deflector enters is expressed by $Y=(K/B)\times\tan(B\times\theta)$ where B is a scanning properties coefficient.

10. The image forming apparatus according to claim 9, further comprising:
a printer controller configured to convert code data input from an external device into image signals, and to input the image signals to the light scanning apparatus.

* * * * *